United States Patent
Detweiler et al.

(10) Patent No.: US 11,901,758 B2
(45) Date of Patent: Feb. 13, 2024

(54) LOADING SHARING ACROSS MULTIPLE POWER SUPPLIES

(71) Applicant: General Electric Company, Schenectady, NY (US)

(72) Inventors: Gregory L. Detweiler, Cincinnati, OH (US); Pradeep Vijayan, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/539,368

(22) Filed: Dec. 1, 2021

(65) Prior Publication Data
US 2023/0117539 A1    Apr. 20, 2023

(30) Foreign Application Priority Data
Sep. 14, 2021   (IN) .............................. 202111041205

(51) Int. Cl.
*H02J 7/00*        (2006.01)

(52) U.S. Cl.
CPC ........ *H02J 7/00712* (2020.01); *H02J 7/0013* (2013.01); *H02J 7/00032* (2020.01); *H02J 7/0048* (2020.01); *H02J 7/0063* (2013.01); *H02J 2310/44* (2020.01)

(58) Field of Classification Search
CPC .. H02J 7/00712; H02J 7/00032; H02J 7/0013; H02J 7/0048; H02J 7/0063; H02J 2310/44
See application file for complete search history.

(56) References Cited

U.S. PATENT DOCUMENTS

| | | | |
|---|---|---|---|
| 1,770,937 | A | 7/1930 | Martin |
| 10,693,314 | B2 | 6/2020 | Collins et al. |
| 10,906,658 | B2 | 2/2021 | Long et al. |
| 10,965,125 | B2 | 3/2021 | White |

(Continued)

FOREIGN PATENT DOCUMENTS

JP        2016201976 A      12/2016

OTHER PUBLICATIONS

Bhosale et al, "A Novel Control Strategy to Achieve SOC Balancing for Batteries in a DC Microgrid Without Droop Control", IEEE Transaction on Industry Application, IEEE Service Center, New Jersey, vol. 57, No. 4, Apr. 14, 2021, pp. 4196-4202.

*Primary Examiner* — Lincoln D Donovan
*Assistant Examiner* — Alex W Lam
(74) *Attorney, Agent, or Firm* — Dority & Manning, P.A.

(57) ABSTRACT

A power system (150) operable to implement a power balancing control scheme is provided. In one aspect, a power system (150) includes multiple independent power supplies (182A, 182B) with independent batteries (172A, 172B) feeding onto a common power bus (180). The power supplies (182A, 182B) regulate the voltage on the common power bus (180) at the same time. The power balancing control scheme, when implemented, causes the load on the common power bus (180) to be shared among the individual power supplies (182A, 182B) with a specified load distribution. The specified load distribution can be set or determined to balance the State of Charge (SoC) of the batteries (172A, 172B) over time whilst taking into account the constraints or limits of the elements (172A, 172B, 182A, 182B) of the power system (150).

20 Claims, 11 Drawing Sheets

(56) References Cited

U.S. PATENT DOCUMENTS

| | | |
|---|---|---|
| 10,981,526 B2 * | 4/2021 | Celinske ............. B60L 15/2009 |
| 11,097,624 B2 | 8/2021 | Kobayashi |
| 2014/0247014 A1 | 9/2014 | Nishikawa et al. |
| 2015/0311831 A1 * | 10/2015 | Yamada ................ H02J 7/0063 |
| | | 307/82 |
| 2017/0282745 A1 * | 10/2017 | Kawamura ............. B60L 58/13 |
| 2018/0062403 A1 * | 3/2018 | Jeon ........................ H02J 7/005 |
| 2019/0315480 A1 | 10/2019 | Elliott et al. |
| 2019/0359064 A1 | 11/2019 | Wilhide et al. |
| 2020/0042062 A1 | 2/2020 | Astefanous et al. |
| 2021/0237615 A1 | 8/2021 | Long |

\* cited by examiner

900

902

BIASING A SETPOINT ASSOCIATED WITH EACH ONE OF A PLURALITY OF DC/DC POWER CONVERTERS EACH BEING ELECTRICALLY COUPLED WITH RESPECTIVE BATTERIES, EACH ONE OF THE SETPOINTS BEING BIASED BASED AT LEAST IN PART ON ONE OR MORE BIAS COMMANDS DETERMINED BASED AT LEAST IN PART ON A STATE-OF-CHARGE OF EACH BATTERY OF THE RESPECTIVE BATTERIES AND ONE OR MORE CONSTRAINTS ASSOCIATED WITH EACH BATTERY OF THE RESPECTIVE BATTERIES AND EACH DC/DC POWER CONVERTER OF THE PLURALITY OF DC/DC POWER CONVERTERS, AND WHEREIN EACH DC/DC CONVERTER IS ELECTRICALLY COUPLED WITH A COMMON POWER BUS. IN SOME IMPLEMENTATIONS, THE PLURALITY OF DC/DC POWER CONVERTERS INCLUDES AT LEAST THREE DC/DC POWER CONVERTERS EACH BEING ELECTRICALLY COUPLED WITH RESPECTIVE BATTERIES. THUS, THE SYSTEM ALSO INCLUDES AT LEAST THREE BATTERIES. IN SOME IMPLEMENTATIONS, THE PLURALITY OF DC/DC POWER CONVERTERS INCLUDES AT LEAST THREE BUT EQUAL TO OR LESS THAN ONE HUNDRED DC/DC POWER CONVERTERS EACH BEING ELECTRICALLY COUPLED WITH RESPECTIVE BATTERIES

904

CONTROLLING THE PLURALITY OF DC/DC CONVERTERS BASED AT LEAST IN PART ON THEIR RESPECTIVE BIASED SETPOINTS

FIG. 9

LOADING SHARING ACROSS MULTIPLE POWER SUPPLIES

PRIORITY INFORMATION

The present application claims priority to Indian Provisional Patent Application 202111041205 filed on Sep. 14, 2021.

FIELD

The present subject matter relates generally to electrical power systems, such as electrical power systems for aircraft.

BACKGROUND

Electric and hybrid-electric propulsion systems are being developed to improve an efficiency of conventional commercial aircraft. Such propulsion systems can include a battery system for providing electrical power to various loads, such as one or more electric machines operable to drive one or more fans. The battery system can also be configured to accept electrical power. DC/DC converters can be used to regulate the voltage of the direct current transmitted to or from the battery system. Uneven wear on batteries of the battery system has presented certain challenges. Accordingly, a control scheme that address these challenges would be a welcome addition to the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 9 provides a flow diagram for a method of implementing a power balancing control scheme for an electrical power system;

DETAILED DESCRIPTION

Figure 1:
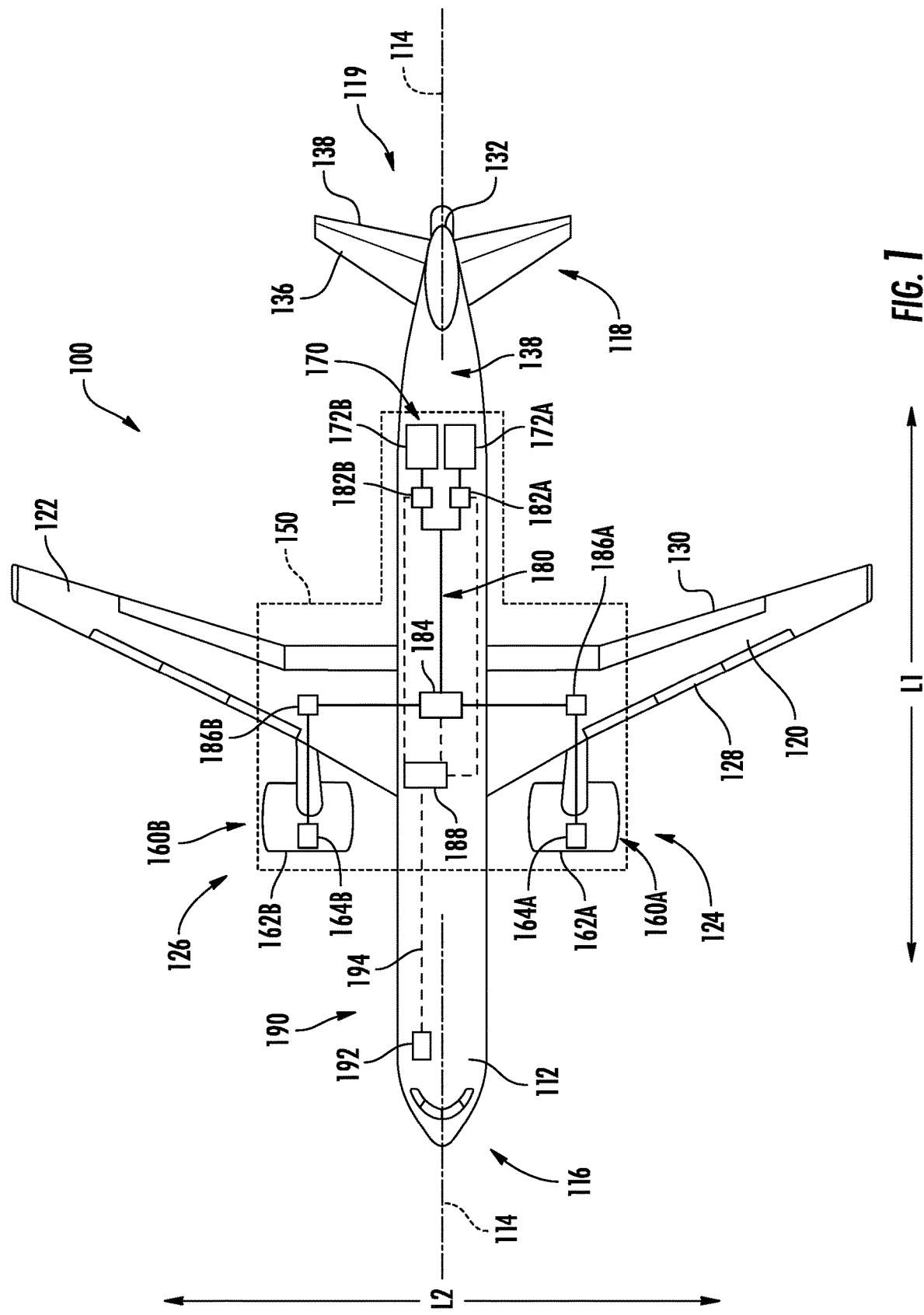
FIG. 1 provides a schematic top view of an aircraft having a hybrid-electric propulsion system according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Electrical power systems operable to implement a power balancing control scheme is provided. In one example aspect, an electrical power system, such as an aircraft hybrid-electric propulsion system, includes multiple independent power supplies with independent batteries feeding onto a common power bus. The power supplies, such as DC/DC converters, can regulate the voltage on the common power bus at the same time. The power balancing control scheme, when implemented, ensures that the load on the common power bus is shared among the individual power supplies with a specified load distribution or power share. The specified load distribution can be set or determined to balance the State of Charge (SoC) of the batteries over time whilst taking into account the constraints or limits of the elements of the power system. The power balancing control scheme, when implemented, can bias one or more power supplies to draw or provide more electrical power to their associated batteries whilst biasing one or more other power supplies to draw or provide less electrical power to their associated batteries. In this regard, the power balancing control scheme adjusts the power share of the power supplies.

Systems architecturally arranged and operable to implement the disclosed power balancing control scheme may have certain advantages and benefits. For instance, such a system architecture may allow for multiple independent power supplies to regulate voltage on the same bus at the same time, without need for a master/slave architecture or high-speed communication between the power supplies and/or supervisor controller. In addition, such a system architecture may allow for faster responses to bus load changes as each power supply is regulating the power bus voltage, and bus voltage collapse can be avoided if one or more power supply fails. Further, the implementation of such a power balancing control scheme may avoid target voltage droop at increasing loads by allowing all power supplies to use integral control. Moreover, the implementation of such a power balancing control scheme may avoid pushing or pulling more power from an individual power supply than that power supply can provide and may automatically balance the SoC of individual batteries, which evens out wear and maximizes system capacity. Other benefits and advantages may be realized as well.

FIG. 1 provides a schematic top view of an exemplary aircraft 100 as may incorporate one or more inventive aspects of the present disclosure. As shown in FIG. 1, for reference, the aircraft 100 defines a longitudinal direction L1 and a lateral direction L2. The lateral direction L2 is perpendicular to the longitudinal direction L1. The aircraft 100 also defines a longitudinal centerline 114 that extends therethrough along the longitudinal direction L1. The aircraft 100 extends between a forward end 116 and an aft end 118, e.g., along the longitudinal direction L1.

As depicted, the aircraft 100 includes a fuselage 112 that extends longitudinally from the forward end 116 of the aircraft 100 to the aft end 118 of the aircraft 100. The aircraft 100 also includes an empennage 119 at the aft end 118 of the aircraft 100. In addition, the aircraft 100 includes a wing assembly including a first, port side wing 120 and a second, starboard side wing 122. The first and second wings 120, 122 each extend laterally outward with respect to the longitudinal centerline 114. The first wing 120 and a portion of the fuselage 112 together define a first side 124 of the aircraft 100 and the second wing 122 and another portion of the fuselage 112 together define a second side 126 of the aircraft 100. For the embodiment depicted, the first side 124 of the aircraft 100 is configured as the port side of the aircraft 100 and the second side 126 of the aircraft 100 is configured as the starboard side of the aircraft 100.

The aircraft 100 includes various control surfaces. For this embodiment, each wing 120, 122 includes one or more leading edge flaps 128 and one or more trailing edge flaps 130. The aircraft 100 further includes, or more specifically, the empennage 119 of the aircraft 100 includes a vertical stabilizer 132 having a rudder flap (not shown) for yaw control and a pair of horizontal stabilizers 134 each having an elevator flap 136 for pitch control. The fuselage 112 additionally includes an outer surface or skin 138. It should be appreciated that, in other exemplary embodiments of the present disclosure, the aircraft 100 may additionally or alternatively include any other suitable configuration. For example, in other embodiments, the aircraft 100 may include any other control surface configuration.

The exemplary aircraft 100 of FIG. 1 also includes a hybrid-electric propulsion system 150. For this embodiment, the hybrid-electric propulsion system 150 has a first propulsor 160A and a second propulsor 160B both operable to produce thrust. The first propulsor 160A is mounted to the first wing 120 and the second propulsor 160B is mounted to the second wing 122. Moreover, for the embodiment depicted, the first propulsor 160A and second propulsor 160B are each configured in an underwing-mounted configuration. However, in other example embodiments, one or both of the first and second propulsors 160A, 160B may be mounted at any other suitable location in other exemplary embodiments.

The first propulsor 160A includes a first gas turbine engine 162A and one or more electric machines, such as a first electric machine 164A mechanically coupled with the first gas turbine engine 162A. The first electric machine 164A can be directly mechanically coupled to a shaft of the first gas turbine engine 162A or indirectly via a gearbox, for example. The first electric machine 164A can be an electric generator, an electric motor, or a combination generator/motor. For this example embodiment, the first electric machine 164A is a combination generator/motor. In this manner, when operating as an electric generator, the first electric machine 164A can generate electrical power when driven by the first gas turbine engine 162A. When operating as an electric motor, the first electric machine 164A can drive or motor the first gas turbine engine 162A. The first gas turbine engine 162A can be any suitable type of gas turbine engine, including a turbofan, turbojet, turboprop, turboshaft, etc.

Likewise, the second propulsor 160B includes a second gas turbine engine 162B and one or more electric machines, such as a second electric machine 164B mechanically coupled with the second gas turbine engine 162B. The second electric machine 164B can be directly mechanically coupled to a shaft of the second gas turbine engine 162B or indirectly via a gearbox, for example. The second electric machine 164B can be an electric generator, an electric motor, or a combination generator/motor. For this example embodiment, the second electric machine 164B is a combination generator/motor. In this manner, when operating as an electric generator, the second electric machine 164B can generate electrical power when driven by the second gas turbine engine 162B. When operating as an electric motor, the second electric machine 164B can drive or motor a spool of the second gas turbine engine 162B. The second electric machine 164B can be configured and can operate in a similar manner as first electric machine 164A described herein. The second gas turbine engine 162B can be any suitable type of gas turbine engine, including a turbofan, turbojet, turboprop, turboshaft, etc.

The hybrid-electric propulsion system 150 further includes an electric energy storage system 170. The electric energy storage system 170 can include one or more electric energy storage devices, such as batteries, supercapacitor arrays, one or more ultracapacitor arrays, some combination of the foregoing, etc. For instance, for this embodiment, the electric energy storage system 170 includes a first battery 172A and a second battery 172B. The first battery 172A is electrically coupled with a first DC/DC converter 182A and the second battery 172B is electrically coupled with a second DC/DC converter 182B.

The first DC/DC converter 182A and the second DC/DC converter 182B can both be independent voltage-regulating power supplies. Further, in some embodiments, the first DC/DC converter 182A and the second DC/DC converter 182B can both be bidirectional DC/DC converters. In this regard, the first DC/DC converter 182A can control the electrical power drawn from the first battery 172A and the electrical power provided to the first battery 172A depending on whether it is desired to discharge or charge the first battery 172A. Similarly, the second DC/DC converter 182B can control the electrical power drawn from the second battery 172B and the electrical power provided to the second battery 172B depending on whether it is desired to discharge or charge the second battery 172B.

The first DC/DC converter 182A and the second DC/DC converter 182B are both electrically coupled with a power bus 180. The first DC/DC converter 182A and the second DC/DC converter 182B are both electrically coupled to the same bus, power bus 180. In this manner, the hybrid-electric propulsion system 150 includes multiple independent voltage-regulating power supplies feeding from independent batteries onto on a common power bus.

A power distribution unit 184 is positioned along the power bus 180. The power distribution unit 184 can be controlled to distribute electrical power to various loads of the aircraft 100. For instance, electrical power drawn from the first battery 172A and the second battery 172B can be directed to the power distribution unit 184 across the power bus 180, and the power distribution unit 184 can distribute the electrical power to various aircraft loads, such as the first electric machine 164A and/or the second electric machine 164B. A first AC/DC converter 186A associated with the first electric machine 164A can be positioned along the power bus 180 for converting direct current into alternating current or vice versa. Similarly, a second AC/DC converter 186B associated with the second electric machine 164B can be positioned along the power bus 180 for converting direct current into alternating current or vice versa.

The power distribution unit 184 and other controllable electrical elements of the hybrid-electric propulsion system 150 can be managed by a power management system. The power management system can include a supervisor controller 188 operable to control, among other elements, the power distribution unit 184, the first DC/DC converter 182A, and the second DC/DC converter 182B. As will be explained in greater detail herein, the supervisor controller 188 can determine and send one or more bias commands to the first DC/DC converter 182A and the second DC/DC converter 182B that tend to balance the State-Of-Charge (SoC) of the first battery 172A and the second battery over time whilst taking into account the power limits of the first DC/DC converter 182A, the second DC/DC converter 182B, the first battery 172A, and the second battery 172B as a function of SoC.

As further shown in FIG. 1, the supervisor controller 188 can form a part of a computing system 190 of the aircraft 100. The computing system 190 of the aircraft 100 can include one or more processors and one or more memory devices embodied in one or more computing devices. For instance, as depicted in FIG. 1, the computing system 190 includes the supervisor controller 188 as well as other computing devices, such as computing device 192. The computing system 190 can include other computing devices as well, such as engine controllers (not shown). The computing devices of the computing system 190 can be communicatively coupled with one another via a communication network. For instance, computing device 192 is located in the cockpit of the aircraft 100 and is communicatively coupled with the supervisor controller 188 of the hybrid-electric propulsion system 150 via a communication link 194 of the communication network. The communication link 194 can include one or more wired or wireless communication links.

For this embodiment, the computing device 192 is configured to receive and process inputs, e.g., from a pilot or other crew members, and/or other information. In this manner, as one example, the one or more processors of the computing device 192 can receive an input indicating a command to change a thrust output of the first and/or second propulsors 160A, 160B, and can cause, in response to the input, the supervisor controller 188 to control the electrical power drawn from or delivered to one or both of the first battery 172A, the second battery 172B, and/or the electric machines 164A, 164B to ultimately change the thrust output of one or both of the propulsors 160A, 160B.

The supervisor controller 188 and other computing devices of the computing system 190 of the aircraft 100 may be configured in the same or substantially the same manner as the exemplary computing devices of the computing system 1100 described below with reference to FIG. 11.

While the aircraft 100 depicted in FIG. 1 includes the hybrid-electric propulsion system 150, it will be appreciated that the inventive aspects of the present disclosure can apply equally to fully electric propulsion systems. Moreover, the inventive aspects of the present disclosure can apply to other electrical power systems outside of the aviation industry that include multiple independent voltage-regulating power supplies feeding from independent batteries onto on a common bus.

Figure 2:
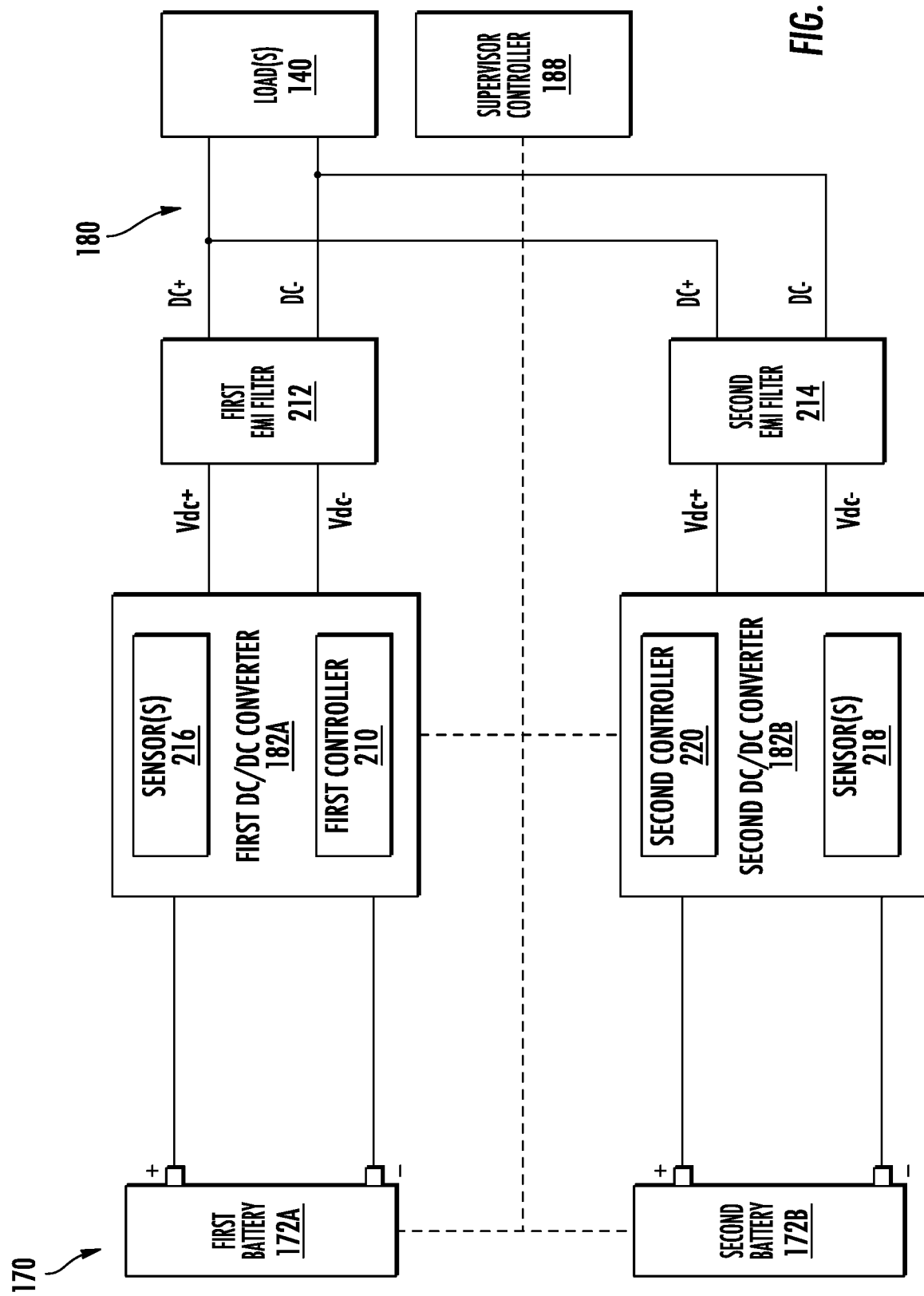
FIG. 2 provides a system diagram depicting certain aspects of the hybrid-electric propulsion system of the aircraft of FIG. 1.

FIG. 2 provides a system diagram depicting certain aspects of the hybrid-electric propulsion system 150 of the aircraft 100 of FIG. 1. Particularly, FIG. 2 depicts the first battery 172A and the second battery 172B of the electric energy storage system 170 electrically coupled with their respective DC/DC converters 182A, 182B. The first DC/DC converter 182A is electrically coupled with the positive and negative terminals of the first battery 172A and the second DC/DC converter 182B is electrically coupled with the positive and negative terminals of the second battery 172B.

The first DC/DC converter 182A includes a plurality of switching devices. Likewise, the second DC/DC converter 182B also includes a plurality of switching devices. The switching devices of the first DC/DC converter 182A and the second DC/DC converter 182B can be any suitable type of switching devices or elements, such as insulated gate bipolar transistors, power MOSFETs, etc.

The switching devices of the first DC/DC converter 182A and the switching devices of the second DC/DC converter 182B can be switched or modulated by one or more controllable devices. For instance, the switching devices can be controlled by one or more associated gate drivers. The one or more gate drivers can be controlled to drive or modulate their respective switching devices to control the electrical power provided to or drawn from their respective first and second batteries 172A, 172B. In some embodiments, each switching device of the first DC/DC converter 182A has an associated gate driver and each switching device of the second DC/DC converter 182B has an associated gate driver. In other embodiments, multiple switching devices of the first DC/DC converter 182A can be driven by a single gate driver and/or multiple switching devices of the second DC/DC converter 182B can be driven by a single gate driver. By turning on or off the switching devices of the first DC/DC converter 182A, electrical power provided or drawn from the first battery 172A can be controlled. Likewise, by turning on or off the switching devices of the second DC/DC converter 182B, electrical power provided or drawn from the second battery 172B can be controlled.

The first DC/DC converter 182A can also include one or more sensors 216. The sensors 216 can sense various characteristics or properties of the electrical power at certain locations within the first DC/DC converter 182A. The sensors 216 can include one or more sensors operable to measure a voltage at their respective locations and/or one or more sensors operable to measure an electric current at their respective locations. As shown in FIG. 2, the second DC/DC converter 182B can also include one or more sensors 218. The one or more sensors 218 of the second DC/DC converter 182B can sense various characteristics or properties of the electrical power at certain locations within the second DC/DC converter 182B. The sensors 218 can include one or more sensors operable to measure a voltage at their respective locations and/or one or more sensors operable to measure an electric current at their respective locations.

The first DC/DC converter 182A can include one or more processors and one or more memory devices. The one or more processors and one or more memory devices can be embodied in one or more controllers or computing devices. For instance, for this embodiment, the one or more processors and one or more memory devices are embodied in a first controller 210. The first controller 210 can be communicatively coupled with various devices, such as the gate drivers associated with the switching devices of the first DC/DC converter 182A, the one or more sensors 216, the supervisor controller 188, as well as other electronic devices. The first controller 210 can be communicatively coupled with such devices via a suitable wired and/or wireless connection. Generally, the first controller 210 can be configured in the same or substantially the same manner as the exemplary computing devices of the computing system 1100 described with reference to FIG. 11.

Similarly, the second DC/DC converter 182B can include one or more processors and one or more memory devices. The one or more processors and one or more memory devices can be embodied in one or more controllers or computing devices. For instance, for the depicted embodiment of FIG. 2, the one or more processors and one or more memory devices are embodied in a second controller 220. The second controller 220 can be communicatively coupled with various devices, such as the gate drivers associated with the switching devices of the second DC/DC converter 182B, the one or more sensors 218 of the second DC/DC converter 182B, the supervisor controller 188, as well as other electronic devices. The second controller 220 can be communicatively coupled with such devices via a suitable wired and/or wireless connection. Generally, the second controller 220 can be configured in the same or substantially the same manner as the exemplary computing devices of the computing system 1100 described with reference to FIG. 11.

The first DC/DC converter 182A has an associated first EMI filter 212, or first electromagnetic interference filter. The positive and negative rails of the first DC/DC converter 182A are shown passing through the first EMI filter 212. Generally, the first EMI filter 212 can suppress electromagnetic noise. The second DC/DC converter 182B has an associated second EMI filter 214, or second electromagnetic interference filter. The positive and negative rails of the second DC/DC converter 182B are shown passing through the second EMI filter 214. Like the first EMI filter 212, the second EMI filter 214 can suppress electromagnetic noise.

As further shown in FIG. 2, the first DC/DC converter 182A and the second DC/DC converter 182B are both electrically coupled to a common bus, which is power bus 180 in this example embodiment. As illustrated, the positive and negative links DC+, DC− associated with the first DC/DC converter 182A are electrically coupled with the positive and negative links DC+, DC− associated with the second DC/DC converter 182B. Electrical power can be transmitted along the power bus 180 from one or more loads 140 to the first and second batteries 172A, 172B (i.e., in a charging mode) or electrical power can be transmitted along the power bus 180 from the first and second batteries 172A, 172B to the one or more loads 140 (i.e., in a discharging mode). The one or more loads 140 can include any combination of aircraft loads, including, for example, the electric machines 164A, 164B depicted in FIG. 1.

Figure 3:
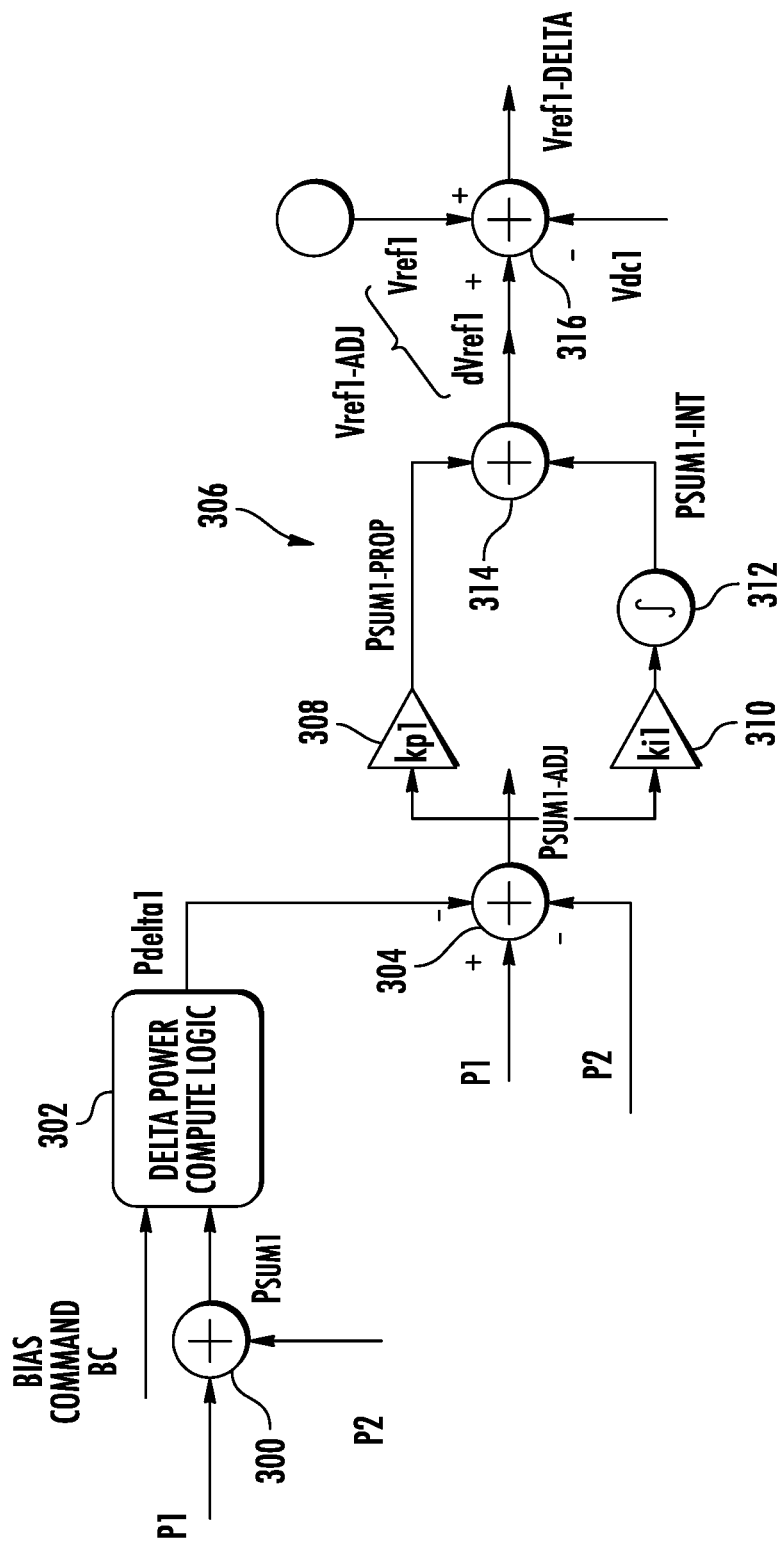
FIG. 3 provides a logic diagram for a first controller associated with a first DC/DC converter of the hybrid-electric propulsion system to implement a power balancing control scheme.
Figure 4:
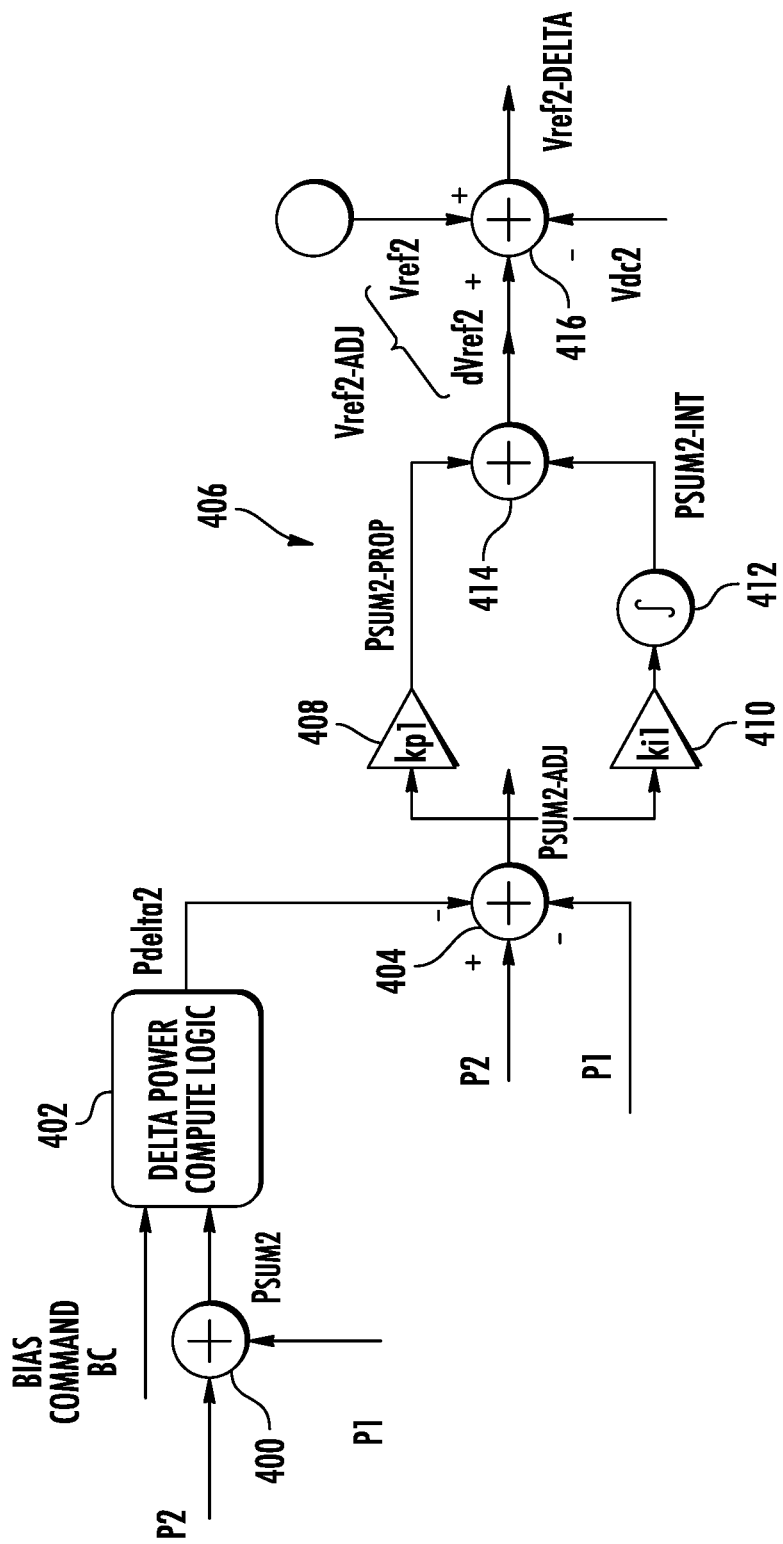
FIG. 4 provides a logic diagram for a second controller associated with a second DC/DC converter of the hybrid-electric propulsion system to implement the power balancing control scheme.
Figure 5:
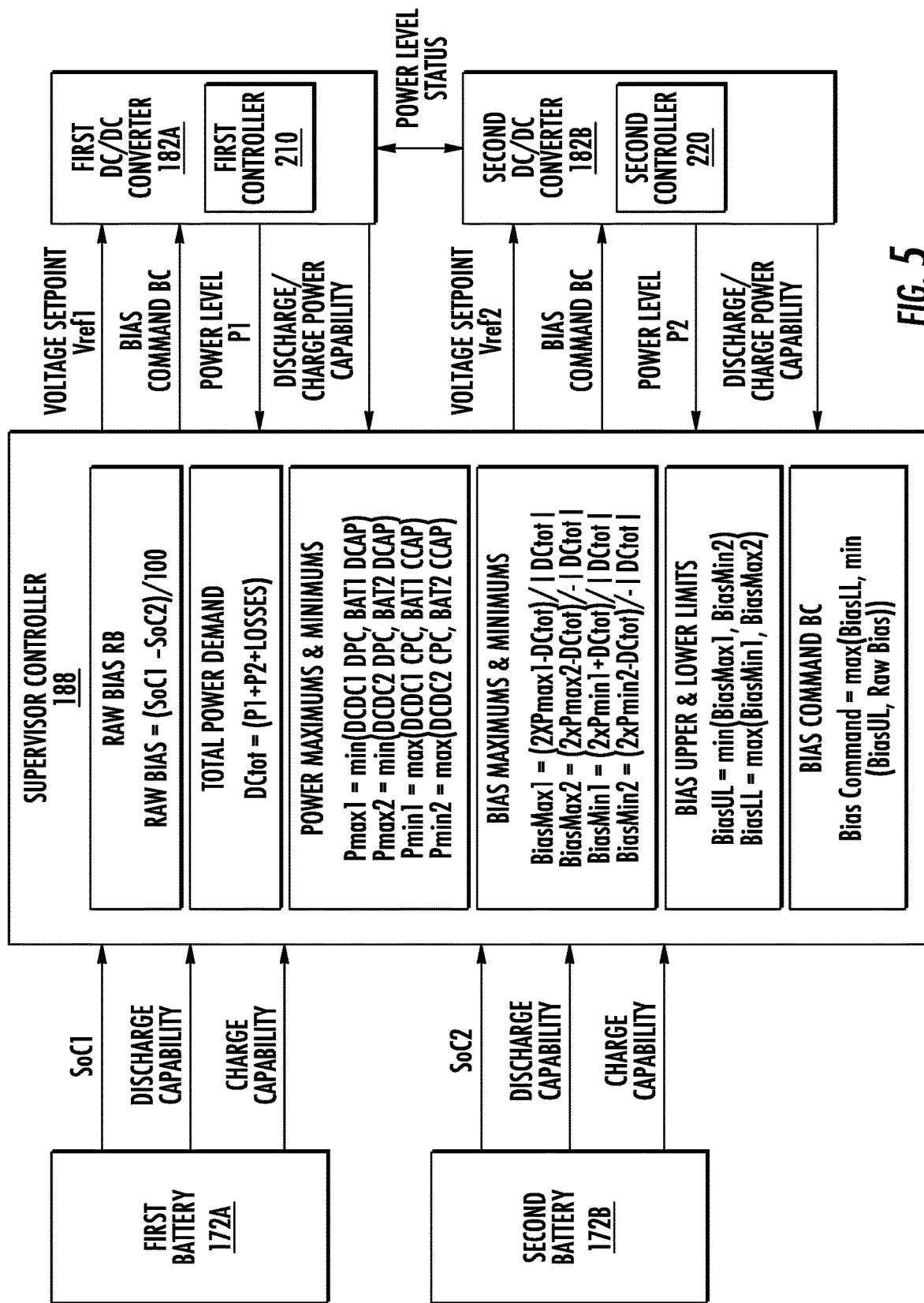
FIG. 5 provides a data flow diagram depicting an exchange of data between some components of the hybrid-electric propulsion system during implementation of the power balancing control scheme.

With reference generally now to FIGS. 1 through 5, FIG. 3 provides a logic diagram for the first controller 210 to implement a power balancing control scheme. FIG. 4 provides a logic diagram for the second controller 220 to implement the power balancing control scheme. FIG. 5 provides a data flow diagram depicting an exchange of data between some components of the system during implementation of the power balancing control scheme. Generally, when implemented, the power balancing control scheme ensures that the load on the common power bus 180 is shared among the individual supplies with a specified load distribution.

As depicted in FIG. 3, at summation block 300, the first controller 210 is configured to determine a first power sum $P_{SUM1}$ based at least in part on a power level P1 at the first DC/DC converter 182A and a power level P2 at the second DC/DC converter 182B. The first controller 210 can determine the first power sum $P_{SUM1}$ by adding the power level P1 at the first DC/DC converter 182A and the power level P2 at the second DC/DC converter 182B. In this regard, the first power sum $P_{SUM1}$ is the sum of the power level P1 and power level P2. As shown in FIGS. 2 and 5, the first controller 210 associated with the first DC/DC converter 182A and the second controller 220 associated with the second DC/DC converter 182B are communicatively coupled with one another, e.g., via a suitable wired and/or wireless connection link. Accordingly, the first controller 210 can receive the power level P2 at the second DC/DC converter 182B for use at summation block 300 across such connection links. The second controller 220 can determine the power level P2 in any suitable manner, such as by receiving inputs from its associated sensors. Likewise, the first controller 210 can determine the power level P1 in any suitable manner, such as by receiving inputs from its associated sensors. As illustrated in FIG. 5, the power level status of the first DC/DC converter 182A can also be shared with the second controller 220 of the second DC/DC converter 182B.

As shown in FIG. 3, at the control logic block 302, the first controller 210 is configured to determine a first power delta Pdelta1 based at least in part on a bias command BC, the power level P1 at the first DC/DC converter 182A, and the power level P2 at the second DC/DC converter 182B. Stated differently, the first controller 210 is configured to determine the first power delta Pdelta1 based at least in part on a bias command BC and the first power sum $P_{SUM1}$ determined at summation block 300. The first controller 210 can receive the bias command BC from the supervisor controller 188 as shown in FIG. 5.

The bias command BC may "bias" the first DC/DC converter 182A to draw more electric power from or provide more electric power to the first battery 172A to ultimately balance the state-of-charge of the first battery 172A and the second battery 172B over time whilst taking into account the constraints or power limits associated with the electrical elements of the system. In this regard, the bias command BC indicates a shift in a power share of the first DC/DC converter 182A to meet a total power demand on the power bus 180. Generally, the bias command BC is determined based at least in part on a state-of-charge of the first battery 172A, a state-of-charge of the second battery 172B, and one or more constraints associated with the first battery 172A, the second battery 172B, the first DC/DC converter 182A, and the second DC/DC converter 182B. The bias command can be a value between +1.0 and −1.0, for example. A detailed example manner in which the bias command BC can be determined will be provided in further detail herein.

As the first power delta Pdelta1 is determined based at least in part on the bias command BC, when the first power delta Pdelta1 is not zero, the first power delta Pdelta1 makes the power share between the first DC/DC converter 182A and the second DC/DC converter 182B to be different by a specific amount. That is, when the first power delta Pdelta1 determined at the control logic block 302 is determined to be not zero, the power share of the first DC/DC converter 182A is different than a power share of the second DC/DC converter 182B to meet the total power demand on the power bus 180. When the first power delta Pdelta1 is zero, the first DC/DC converter 182A and the second DC/DC converter 182B have the same power share (e.g., 50/50) to meet the total power demand on the power bus 180, assuming the first battery 172A and the second battery 172B are the only voltage sources supplying the power bus 180.

At summation block 304, the first controller 210 is configured to determine an adjusted first power sum $P_{SUM1\text{-}ADJ}$ based at least in part on the power level P1 at the first DC/DC converter 182A, the power level P2 at the second DC/DC converter 182B, and the first power delta Pdelta1. The first controller 210 can determine the adjusted first power sum $P_{SUM1\text{-}ADJ}$ by adding the power level P1 at the first DC/DC converter 182A and the power level P2 at the second DC/DC converter 182B and then subtracting their sum by the first power delta Pdelta1.

With the adjusted first power sum $P_{SUM1\text{-}ADJ}$ determined, the first controller 210 is configured to determine a first voltage adjuster dVref1. The first voltage adjuster dVref1 can be determined based at least in part on the first power delta Pdelta1, the power level P1 at the first DC/DC converter 182A, and the power level P2 at the second DC/DC converter 182B. That is, the first voltage adjuster dVref1 can be determined based at least in part on the adjusted first power sum $P_{SUM1\text{-}ADJ}$. As shown in FIG. 3, the adjusted first power sum $P_{SUM1\text{-}ADJ}$ is input into a PI loop 306. The PI loop 306 includes a proportional branch along which a proportional gain 308 is positioned. The PI loop 306 also includes an integral branch along which an integral gain 310 and an integral block 312 are positioned. The adjusted first power sum $P_{SUM1\text{-}ADJ}$ is fed through the proportional gain 308 along the proportional branch to render a proportional power sum $P_{SUM1\text{-}PROP}$. The adjusted first power sum $P_{SUM1\text{-}ADJ}$ is also fed through the integral gain 310 and integral block 312 along the integral branch to render an integral power sum $P_{SUM1\text{-}INT}$. At summation block 314, the proportional power sum $P_{SUM1\text{-}PROP}$ and the integral power sum $P_{SUM1\text{-}INT}$ are summed. The output of the summation block 314 is the first voltage adjuster dVref1.

The first controller 210 is configured to receive a first voltage setpoint Vref1. The first voltage setpoint Vref1 can be received from the supervisor controller 188, for example. The first controller 210 is also configured to receive a first feedback voltage Vdc1 indicating an actual voltage associated with the first DC/DC converter 182A. The actual voltage associated with the first DC/DC converter 182A can be measured by one or more of the sensors associated with the first DC/DC converter 182A.

As depicted in FIG. 3, the first controller 210 is configured to determine a first adjusted voltage setpoint Vref1-ADJ based at least in part on the first voltage setpoint Vref1 and the first voltage adjuster dVref1. Particularly, at summation block 316, the first controller 210 is configured to determine the first adjusted voltage setpoint Vref1-ADJ by adding the first voltage setpoint Vref1 and the first voltage adjuster dVref1. In this regard, the first voltage setpoint Vref1 is adjusted by the first voltage adjuster dVref1, which is determined based at least in part on the bias command BC. As further shown in FIG. 3, the first feedback voltage Vdc1 is subtracted from the first adjusted voltage setpoint Vref1-ADJ to render a first voltage delta Vref1-delta.

The first controller 210 is further configured to control the one or more switching devices of the first DC/DC converter 182A based at least in part on the first voltage delta Vref1-delta, which is determined based at least in part on the first adjusted voltage setpoint Vref1-ADJ. For instance, the first voltage delta Vref1-delta can be converted into an electric current demand, and based on the electric current demand, a duty cycle of the switching devices of the first DC/DC converter 182A can be set. The switching devices of the first DC/DC converter 182A can be switched in accordance with their determined duty cycles to draw a specified amount of power from or provide power to the first battery 172A.

As depicted in FIG. 4, the power balancing control scheme can be implemented by the second controller 220 in much the same manner as implemented by the first controller 210. The second controller 220 can implement the power balancing control scheme as set forth below.

At summation block 400, the second controller 220 is configured to determine a second power sum $P_{SUM2}$ based at least in part on the power level P1 at the first DC/DC converter 182A and the power level P2 at the second DC/DC converter 182B. The second controller 220 can determine the second power sum $P_{SUM2}$ by adding the power level P1 at the first DC/DC converter 182A and the power level P2 at the second DC/DC converter 182B.

At the control logic block 402, the second controller 220 is configured to determine a second power delta Pdelta2 based at least in part on a bias command BC, the power level P1 at the first DC/DC converter 182A, and the power level P2 at the second DC/DC converter 182B. Stated another way, the second controller 220 is configured to determine the second power delta Pdelta2 based at least in part on the bias command BC and the second power sum $P_{SUM2}$ determined at summation block 400. The second controller 220 can receive the bias command BC from the supervisor controller 188 as shown in FIG. 5.

The bias command BC may "bias" the second DC/DC converter 182B to draw more electric power from or provide more electric power to the second battery 172B to ultimately balance the state-of-charge of the first battery 172A and the second battery 172B over time whilst taking into account the constraints or power limits associated with the electrical elements of the system. In this regard, the bias command BC indicates a shift in a power share of the second DC/DC converter 182B to meet the total power demand on the power bus 180. Generally, the bias command BC is determined based at least in part on the state-of-charge of the first battery 172A, the state-of-charge of the second battery 172B, and one or more constraints associated with the first battery 172A, the second battery 172B, the first DC/DC converter 182A, and the second DC/DC converter 182B. In some embodiments, particularly where the first and second batteries 172A, 172B are the only voltage sources supplying the power bus 180, the power share of the second DC/DC converter 182B can be an inverse of the power share of the first DC/DC converter 182A. For instance, as one example, when the power share of the second DC/DC converter 182B is 60% percent power share, the power share of the first DC/DC converter 182A is 40% percent power share. As a second example, when the power share of the second DC/DC converter 182B is 30% percent power share, the power share of the first DC/DC converter 182A is 70% percent power share.

As the second power delta Pdelta2 is determined based at least in part on the bias command BC, when the first power delta Pdelta2 is not zero, the second power delta Pdelta2 makes the power share between the first DC/DC converter 182A and the second DC/DC converter 182B to be different by a specific amount. That is, when the second power delta Pdelta2 determined at the control logic block 402 is determined to be not zero, the power share of the first DC/DC converter 182A is different than a power share of the second DC/DC converter 182B to meet the total power demand on the power bus 180. When the second power delta Pdelta2 is zero, the first DC/DC converter 182A and the second DC/DC converter 182B have the same power share (e.g., 50/50) to meet the total power demand on the power bus 180, assuming the first battery 172A and the second battery 172B are the only voltage sources supplying the power bus 180.

At summation block 404, the second controller 220 is configured to determine an adjusted second power sum $P_{SUM2-ADJ}$ based at least in part on the power level P1 at the first DC/DC converter 182A, the power level P2 at the second DC/DC converter 182B, and the second power delta Pdelta2. The second controller 220 can determine the adjusted second power sum $P_{SUM2-ADJ}$ by adding the power level P1 at the first DC/DC converter 182A and the power level P2 at the second DC/DC converter 182B and then subtracting their sum by the second power delta Pdelta2.

With the adjusted second power sum $P_{SUM2-ADJ}$ determined, the second controller 220 is configured to determine a second voltage adjuster dVref2. The second voltage adjuster dVref2 can be determined based at least in part on the second power delta Pdelta2, the power level P1 at the first DC/DC converter 182A, and the power level P2 at the second DC/DC converter 182B. That is, the second voltage adjuster dVref2 can be determined based at least in part on the adjusted second power sum $P_{SUM2-ADJ}$ As shown in FIG. 4, the adjusted second power sum $P_{SUM2-ADJ}$ is input into a PI loop 406. The PI loop 406 includes a proportional branch along which a proportional gain 408 is positioned. The PI loop 406 also includes an integral branch along which an integral gain 410 and an integral block 412 are positioned. The adjusted second power sum $P_{SUM2-ADJ}$ is fed through the proportional gain 408 along the proportional branch to render a proportional power sum $P_{SUM2-PROP}$ The adjusted second power sum $P_{SUM2-ADJ}$ is also fed through the integral gain 410 and integral block 412 along the integral branch to render an integral power sum $P_{SUM2-INT}$. At summation block 414, the proportional power sum $P_{SUM2-PROP}$ and the integral power sum $P_{SUM2-INT}$ are summed. The output of the summation block 414 is the second voltage adjuster dVref2.

The second controller 220 is configured to receive a second voltage setpoint Vref2. The second voltage setpoint Vref2 can be received from the supervisor controller 188, for example. The second controller 220 is also configured to receive a second feedback voltage Vdc2 indicating an actual voltage associated with the second DC/DC converter 182B. The actual voltage associated with the second DC/DC converter 182B can be measured by one or more of the sensors associated with the second DC/DC converter 182B.

As depicted in FIG. 4, the second controller 220 is configured to determine a second adjusted voltage setpoint Vref2-ADJ based at least in part on the second voltage setpoint Vref2 and the second voltage adjuster dVref2. Particularly, at summation block 416, the second controller 220 is configured to determine the second adjusted voltage setpoint Vref2-ADJ by adding the second voltage setpoint Vref2 and the second voltage adjuster dVref2. In this regard, the second voltage setpoint Vref2 is adjusted by the second voltage adjuster dVref2, which is determined based at least in part on the bias command BC. As further depicted in FIG. 4, the second feedback voltage Vdc2 is subtracted from the second adjusted voltage setpoint Vref2-ADJ to render a second voltage delta Vref2-delta.

The second controller 220 is further configured to control the one or more switching devices of the second DC/DC converter 182B based at least in part on the second voltage delta Vref2-delta, which is determined based at least in part on the second adjusted voltage setpoint Vref2-ADJ. For instance, the second voltage delta Vref2-delta can be converted into an electric current demand, and based on the electric current demand, a duty cycle of the switching devices of the second DC/DC converter 182B can be set. The switching devices of the second DC/DC converter 182B can be switched in accordance with their determined duty cycles to draw a specified amount of power from or provide power to the second battery 172B.

With reference now still to FIGS. 1 through 5 with particular reference to FIG. 5, an example manner in which the one or more bias commands can be determined will be provided. As shown in FIG. 5, as well as in FIG. 2, the supervisor controller 188 is communicatively coupled with the first controller 210 of the first DC/DC converter 182A, the second controller 220 of the second DC/DC converter 182B, the first battery 172A, and the second battery 172B, e.g., via one or more suitable wired or wireless connections. In some embodiments, although not shown, the first and second batteries 172A, 172B can include a battery management system having one or more processors and one or more memory devices. The battery management system can be communicatively coupled with the supervisor controller 188. In this regard, the first and second batteries 172A, 172B can be communicatively coupled with the supervisor controller 188. In other embodiments, the first battery 172A and the second battery 172B can each include dedicated controllers that can be directly communicatively coupled with the supervisor controller 188.

The supervisor controller 188 is configured to receive data from the first battery 172A, the second battery 17B, the first DC/DC converter 182A, and the second DC/DC converter 182B, among other possible elements. Particularly, the supervisor controller 188 is configured to receive a state-of-charge associated with the first battery 172A. The state-of-charge associated with the first battery 172A indicates a present battery capacity of the first battery 172A as a percentage of a maximum capacity associated with the first battery 172A. The supervisor controller 188 is also configured to receive one or more constraints associated with the first battery 172A. For instance, the one or more constraints can include at least one of a discharge capability and a charge capability associated with the first battery 172A. For example, when the system is operating in a charging mode, the one or more constraints can include the charge capability associated with the first battery 172A. The charge capability of the first battery 172A indicates an amount of electrical power that can be accepted by the first battery 172A. When the system is operating in a discharge mode, the one or more constraints can include the discharge capability associated with the first battery 172A. The discharge capability of the first battery 172A indicates an amount of electrical power that can be discharged from the first battery 172A. The state-of-charge, the charge capability, and discharge capability of the first battery 172A can take into account the age or deterioration associated with the first battery 172A and one or more operating conditions associated with first battery 172A, such as one or more thermal conditions of the first battery 172A or an associated heat sink for cooling the first battery 172A, the pressure of the ambient air, etc.

Similarly, the supervisor controller 188 is configured to receive a state-of-charge associated with the second battery 172B. The state-of-charge associated with the second battery 172B indicates a present battery capacity of the second battery 172B as a percentage of a maximum capacity associated with the second battery 172B. The supervisor controller 188 is also configured to receive one or more constraints associated with the second battery 172B. For instance, the one or more constraints can include at least one of a discharge capability and a charge capability associated with the second battery 172B. For example, when the system is operating in a charging mode, the one or more constraints can include the charge capability associated with the second battery 172B. The charge capability of the second battery 172B indicates an amount of electrical power that can be accepted by the second battery 172B. When the system is operating in a discharge mode, the one or more constraints can include the discharge capability associated with the second battery 172B. The discharge capability of the second battery 172B indicates an amount of electrical power that can be discharged from the second battery 172B. The state-of-charge, the charge capability, and discharge capability of the second battery 172B can take into account the age or deterioration associated with the second battery 172B and one or more operating conditions associated with second battery 172B, such as one or more thermal conditions of the second battery 172B or an associated heat sink for cooling the second battery 172B, the pressure of the ambient air, etc.

As further shown in FIG. 5, data can be exchanged between the supervisor controller 188 and the first DC/DC converter 182A, between the supervisor controller 188 and the second DC/DC converter 182B, and between the first DC/DC converter 182A and the second DC/DC converter 182B. Particularly, the supervisor controller 188 and the second DC/DC converter 182B can receive, from the first DC/DC converter 182A, a first power level P1 associated with the first DC/DC converter 182A. The supervisor controller 188 and the first DC/DC converter 182A can receive, from the second DC/DC converter 182B, a second power level P2 associated with the second DC/DC converter 182B. These power levels can be used by the first controller 210 and the second controller 220 in implementing the power balancing control scheme as set forth above, and in addition, these power levels can be used in determining the one or more bias commands.

As noted, the supervisor controller 188 can determine the one or more bias commands BC1, BC2 based at least in part on the state-of-charge of the first battery 172A, the state-of-charge of the second battery 172B, and the one or more constraints associated with the first battery 172A, the second battery 172B, the first DC/DC converter 182A, and the second DC/DC converter 182B, among other possible constraints. The supervisor controller 188 can then output the one or more bias commands BC1, BC2 to the first controller 210 and to the second controller 220 as depicted in FIG. 5. Further, as shown, the first controller 210 of the first DC/DC converter 182A can receive the first voltage setpoint Vref1 from the supervisor controller 188 and the second controller 220 of the second DC/DC converter 182B can receive the second voltage setpoint Vref2.

In some example embodiments, to determine a bias command, the supervisor controller 188 is configured to determine a raw bias RB based at least in part on the state-of-charge of the first battery 172A and the state-of-charge of the second battery 172B. The raw bias RB can be calculated according to Equation 1:

$$\text{Raw Bias} = (SoC1 - SoC2)/100 \quad \text{(Equation 1)}$$

wherein SoC1 is the state-of-charge of the first battery 172A, SoC2 is the state-of-charge of the second battery 172B. As will explained further below, absent being constrained by the power limits associated with the first and second batteries 172A, 172B and the first and second DC/DC converters 182A, 182B, the raw bias RB is selected as the bias command BC as the raw bias RB best trends the state-of-charge of the first and second batteries 172A, 172B to match or be the same.

The supervisor controller 188 is configured to determine a total power demand $DC_{tot}$ on the power bus 180 based at least in part on a first power level or demand associated with the first DC/DC converter 182A, a second power level or demand associated with the second DC/DC converter 182B, and any losses associated with the system. The losses may be calculated or predicted power losses associated with the system. The total power demand $DC_{tot}$ on the power bus 180 can be calculated according to Equation 2:

$$DC_{tot} = P1 + P2 + \text{Losses} \quad \text{(Equation 2)}$$

wherein P1 is the first power level associated with the first DC/DC converter 182A, P2 is the second power level associated with the second DC/DC converter 182B, and Losses represents the losses associated with the system. The total power demand $DC_{tot}$ on the power bus 180 can be utilized to determine the power limits associated with the system as noted below.

The supervisor controller 188 is further configured to determine various power maximums and minimums, including a first power maximum Pmax1 associated with the first battery 172A and the first DC/DC converter 182A, a second power maximum Pmax2 associated with the second battery 172B and the second DC/DC converter 182B, a first power minimum Pmin1 associated with the first battery 172A and the first DC/DC converter 182A, and a second power minimum Pmin2 associated with the second battery 172B and the second DC/DC converter 182B. Generally, the power maximums and minimums represent the power limits associated with the first battery 172A, the second battery 172B, the first DC/DC converter 182A, and the second DC/DC converter 182B.

The first power maximum Pmax1 can be determined as the minimum of: the discharge power capability of the first DC/DC converter 182A (labeled as DCDC1 DPC in FIG. 5) and the discharge capability of the first battery 172A (labeled as BAT1 DCAP in FIG. 5). The second power maximum Pmax2 can be determined as the minimum of: the discharge power capability of the second DC/DC converter 182B (labeled as DCDC2 DPC in FIG. 5) and the discharge capability of the second battery 172B (labeled as BAT2 DCAP in FIG. 5). As a first example, with regard to the first power maximum Pmax1, suppose the discharge power capability of the first DC/DC converter 182A is 400 kW and the discharge capability of the first battery 172A is 500 kW. The first power maximum Pmax1 would be determined as 400 kW as 400 kW is the minimum or smaller value between 400 kW and 500 kW. As a second example, with regard to the second power maximum Pmax2, suppose the discharge power capability of the second DC/DC converter 182B is 400 kW and the discharge capability of the second battery 172B is 200 kW. The second power maximum Pmax2 would be determined as 200 kW as 200 kW is the minimum or smaller value between 400 kW and 200 kW.

The first power minimum Pmin1 can be determined as the maximum of: the charge power capability of the first DC/DC converter 182A (labeled as DCDC1 CPC in FIG. 5) and the charge capability of the first battery 172A (labeled as BAT1 CCAP in FIG. 5). The second power minimum Pmin2 can be determined as the maximum of: the charge power capability of the second DC/DC converter 182B (labeled as DCDC2 CPC in FIG. 5) and the charge capability of the second battery 172B (labeled as BAT2 CCAP in FIG. 5). For example, with regard to the first power minimum Pmin1, suppose the charge power capability of the first DC/DC converter 182A is −100 kW and the charge capability of the first battery 172A is −50 kW. The negative values indicate that the system is in a charging mode. The first power minimum Pmin1 would be determined as −50 kW as −50 kW is the maximum or greater value between −100 kW and −50 kW. As another example, with regard to the second power minimum Pmin2, suppose the charge power capability of the second DC/DC converter 182B is −100 kW and the charge capability of the second battery 172B is −150 kW. The second power minimum Pmin2 would be determined as −100 kW as −100 kW is the maximum or greater value between −150 kW and −100 kW.

The supervisor controller 188 is also configured to determine various bias maximums and minimums so as to express the power limits of the first and second batteries 172A, 172B and the first and second DC/DC converters 182A, 182B in terms of bias. Particularly, the supervisor controller 188 can determine a first bias maximum biasMax1, a second bias maximum biasMax2, a first bias minimum biasMin1, and a second bias minimum biasMin2. The first bias maximum biasMax1 can be determined according to Equation 3:

$$\text{biasMax1} = (2*P\max 1 - DC_{tot})/|DC_{tot}| \quad \text{(Equation 3)}$$

The second bias maximum biasMax2 can be determined according to Equation 4:

$$\text{biasMax2} = (2*P\max 2 - DC_{tot})/|DC_{tot}| \quad \text{(Equation 4)}$$

The first bias minimum biasMin1 can be determined according to Equation 5:

$$\text{biasMin1} = (2*P\min 1 - DC_{tot})/|DC_{tot}| \quad \text{(Equation 5)}$$

The second bias minimum biasMin2 can be determined according to Equation 6:

$$\text{biasMin2} = (2*P\min 2 - DC_{tot})/|DC_{tot}| \quad \text{(Equation 6)}$$

The supervisor controller 188 is also configured to determine an upper bias limit BiasUL and a lower bias limit BiasLL based at least in part on the bias maximum and minimums biasMax1, biasMax2, biasMin1, and biasMin2. More specifically, the upper bias limit BiasUL can be determined as a minimum of: the first bias maximum biasMax1 and the second bias minimum biasMin2. The lower bias limit BiasLL can be determined as a maximum of: the first bias minimum biasMin1 and the second bias maximum biasMax2. The upper bias limit BiasUL and the lower bias limit BiasLL can be utilized in determining the bias command.

As depicted in FIG. 5, the supervisor controller 188 is configured to determine the bias command BC based at least in part on the upper bias limit BiasUL and the lower bias limit BiasLL. Particularly, the bias command BC can be determined as the maximum of: the lower bias limit BiasLL and a minimum of the upper bias limit BiasUL and the raw bias RB.

As a first example, suppose the upper bias limit BiasUL is determined as 0.7, the lower bias limit BiasLL is determined as −0.3, and the raw bias RB is determined as 0.5. In this example, the minimum of the upper bias limit BiasUL and the raw bias RB is 0.5, as 0.5 is the minimum or smaller value between 0.5 and 0.7. The maximum of the lower bias limit BiasLL and the raw bias RB is 0.5, as 0.5 is the maximum or greater value between 0.5 and −0.3. Accordingly, the bias command BC is selected as 0.5.

As a second example, suppose the upper bias limit BiasUL is determined as 0.7, the lower bias limit BiasLL is determined as −0.3, and the raw bias RB is determined as −0.5. In this example, the minimum of the upper bias limit BiasUL and the raw bias RB is −0.5, as −0.5 is the minimum or smaller value between −0.5 and 0.7. The maximum of the lower bias limit BiasLL and the raw bias RB is −0.3, as −0.3 is the maximum or greater value between −0.3 and −0.5. Accordingly, the bias command BC is selected as −0.3.

As a third example, suppose the upper bias limit BiasUL is determined as 0.7, the lower bias limit BiasLL is determined as −0.3, and the raw bias RB is determined as 0.9. In this example, the minimum of the upper bias limit BiasUL and the raw bias RB is 0.7, as 0.7 is the minimum or smaller value between 0.7 and 0.9. The maximum of the lower bias limit BiasLL and the raw bias RB is 0.7, as 0.7 is the maximum or greater value between −0.3 and 0.7. Accordingly, the bias command BC is selected as 0.7.

The determined bias command BC can be directed to the first controller 210 of the first DC/DC converter 182A and to the second controller 220 of the second DC/DC converter 182B as depicted in FIG. 5. As shown in FIG. 3, the bias command BC can be input into the control logic block 302 and used to calculate the first power delta Pdelta1, which can ultimately be used to shift the power share of the first DC/DC converter 182A. Further, as shown in FIG. 4, the bias command BC can be input into the control logic block 402 and used to calculate the second power delta Pdelta2, which can ultimately be used to shift the power share of the second DC/DC converter 182B.

In some embodiments, as provided herein, the bias command is determined and sent to both the first controller 210 and the second controller 220. In such embodiments, the bias command is arranged in the control logic block 302 as a positive number while the bias command is arranged in the control logic block 402 as a negative number. In this way, the power share of one of the first DC/DC converter 182A and the second DC/DC converter 182B is increased and the power share of the other is decreased. In other embodiments, the bias command is arranged in the control logic block 302 as a negative number while the bias command is arranged in the control logic block 402 as a positive number.

In yet other embodiments, the supervisor controller 188 can generate multiple bias commands, e.g., one for each DC/DC converter. For instance, if there are two DC/DC converters in the system, then two bias commands are determined, including a first bias command and a second bias command. The first and second bias commands can have the same magnitude but wherein one is a positive number and one is a negative number. For instance, the first bias command can be determined as 0.5 while the second bias command can be determined as −0.5.

Further, in some embodiments, the one or more bias commands can be determined based at least in part on at least one of: i) a state-of-charge of the first battery and a state-of-charge of the second battery, and ii) one or more constraints associated with the first battery, the second battery, the first DC/DC power converter, and the second DC/DC power converter. For instance, in some operating modes, the one or more bias commands can be determined based on a state-of-charge of the first battery and a state-of-charge of the second battery without considering the constraints associated with the first battery, the second battery, the first DC/DC power converter, and the second DC/DC power converter. In yet other embodiments, the one or more bias commands can be determined based on the constraints associated with the first battery, the second battery, the first DC/DC power converter, and the second DC/DC power converter without considering a state-of-charge of the first battery and a state-of-charge of the second battery. In such embodiments, the bias command is determined as the bias upper limit. In other embodiments, as provided above, the one or more bias commands can be determined based at least in part on both: i) a state-of-charge of the first battery and a state-of-charge of the second battery, and ii) one or more constraints associated with the first battery, the second battery, the first DC/DC power converter, and the second DC/DC power converter.

Figure 6:
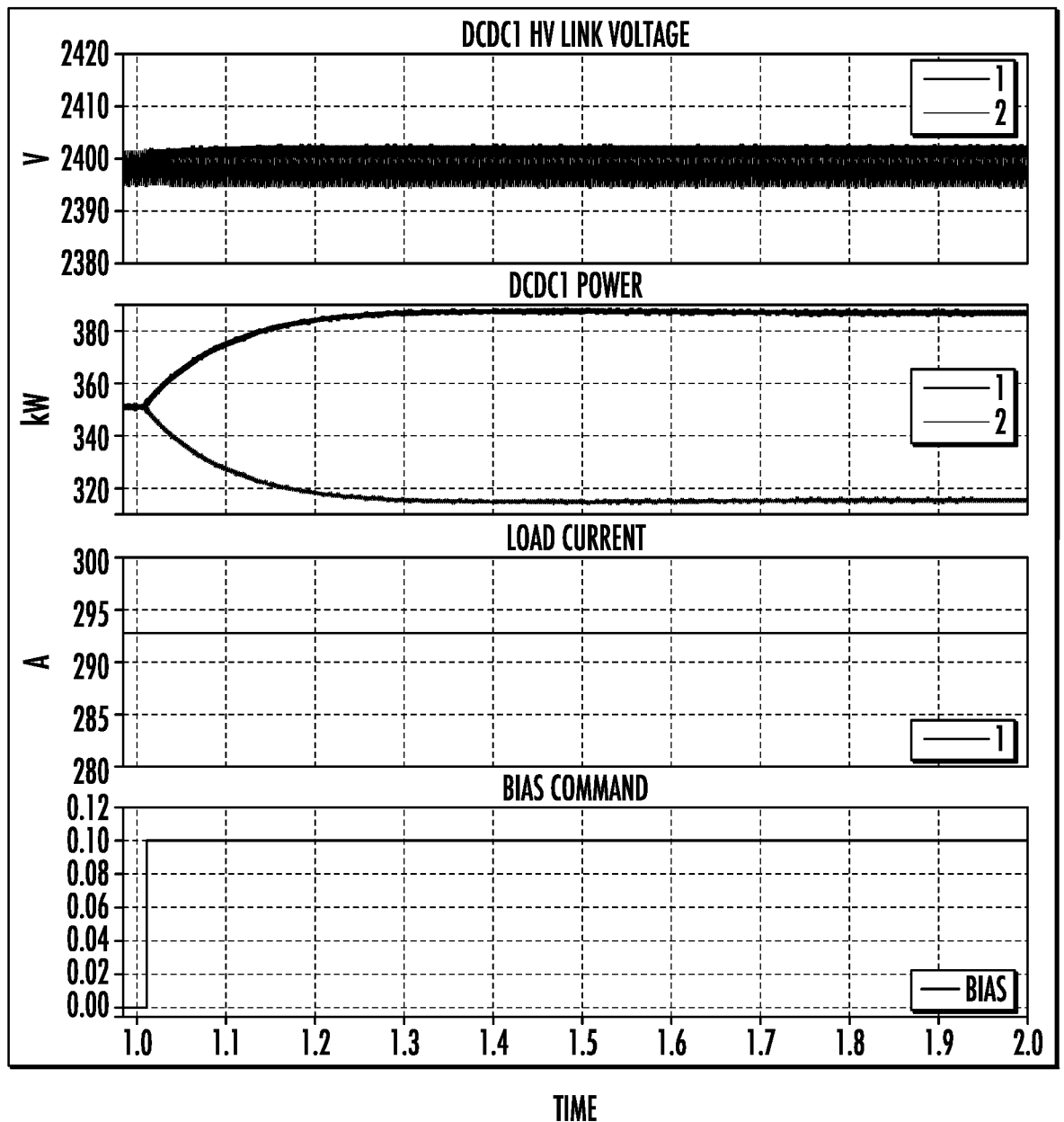
FIG. 6 provides a series of graphs depicting various parameters as a function of time during implementation of the power balancing control scheme.

EXAMPLE 1: With reference now to FIGS. 1 through 5 and specific reference to FIG. 6, an example implementation of the power balancing control scheme will now be provided. FIG. 6 provides a series of graphs depicting various parameters as a function of time. Specifically, FIG. 6 includes a graph depicting a voltage at the first DC/DC converter 182A and a voltage at the second DC/DC converter 182B as a function of time, a graph depicting a power level at the first DC/DC converter 182A and a power level at the second DC/DC converter 182B as a function of time, a graph depicting a load current on the power bus 180 as a function of time, and a bias command as a function of time.

In this example, at time 1.0, the total power demand on the power bus 180 is 700 kW with the power share being equal (50/50) between the first DC/DC converter 182A and the second DC/DC converter 182B at 350 kW of power being supplied by each DC/DC converter. Then, just after time 1.0, the bias command is stepped from 0.0 to 0.1. For instance, it may be determined that the state-of-charge of the second battery 172B needs rebalancing with respect to the state-of-charge of the first battery 172A. Accordingly, it is determined that the first DC/DC converter 182A will supply additional power from the first battery 172A to meet the total power demand on the power bus 180 whilst the second DC/DC converter 182B will supply less power from the second battery 172B to meet the total power demand on the power bus 180. Thus, the first controller 210 can receive the bias command, and based on the bias command, the first controller 210 can control the first DC/DC converter 182A to increase its power share. The second controller 220 can likewise receive the bias command, and based on the bias command, the second controller 220 can control the second DC/DC converter 182B to decrease its power share in meeting the total power demand on the power bus 180.

In accordance with the bias command, the power supplied by the first DC/DC converter 182A is increased to 385 kW (P1=1.1*700/2=385 kW) and the power supplied by the second DC/DC converter 182B is decreased to 315 kW (P2=0.9*700/2=315 kW). Despite adjusting the power share between the two DC/DC converters 182A, 182B (55/45), the voltage is held constant on the power bus 180. Further, when the first DC/DC converter 182A is biased to an increased power share, the setpoint voltage is adjusted to increase, and consequently, the power provided by the first DC/DC converter 182A is also increased. Moreover, when the first DC/DC converter 182A is biased to an increased power share, the second DC/DC converter 182B is biased to a decreased power share. As a result, the setpoint voltage associated with the second DC/DC converter 182B is adjusted to decrease. Thus, the power provided by the second DC/DC converter 182B is also decreased. Advantageously, such a power balancing control scheme can tend to balance the state-of-charge of the first and second batteries 172A, 172B over time whilst taking into account the power limits of the elements of the system.

Figure 7:
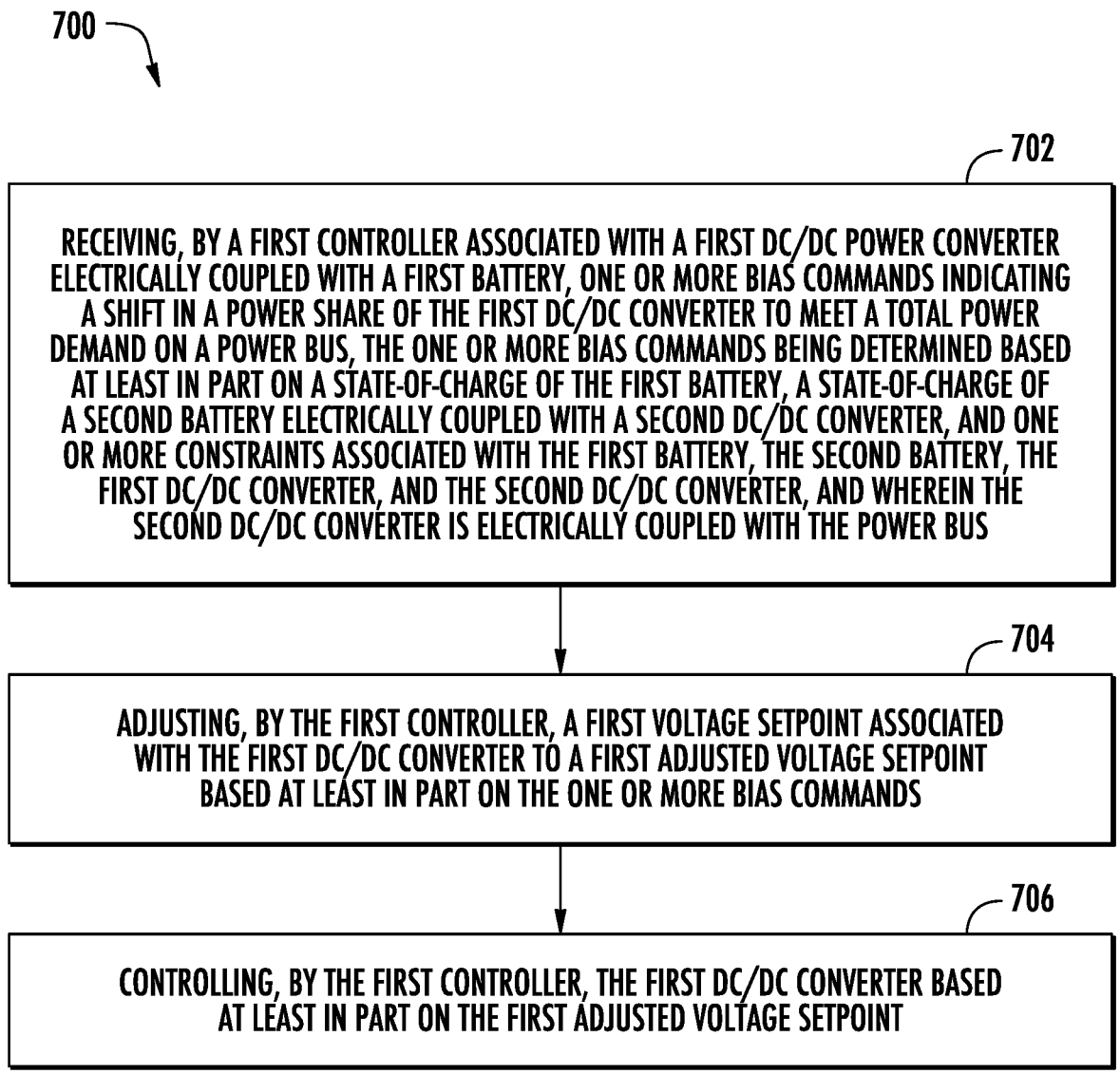
FIG. 7 provides a flow diagram for a method of implementing a power balancing control scheme for an electrical power system.

FIG. 7 provides a flow diagram for a method 700 of implementing a power balancing control scheme for an electrical power system.

At 702, the method 702 includes receiving, by a first controller associated with a first DC/DC power converter electrically coupled with a first battery, one or more bias commands indicating a shift in a power share of the first DC/DC converter to meet a total power demand on a power bus, the one or more bias commands being determined based at least in part on a state-of-charge of the first battery, a state-of-charge of a second battery electrically coupled with a second DC/DC converter, and one or more constraints associated with the first battery, the second battery, the first DC/DC converter, and the second DC/DC converter, and wherein the second DC/DC converter is electrically coupled with the power bus.

At 704, the method 702 includes adjusting, by the first controller, a first voltage setpoint associated with the first DC/DC converter to a first adjusted voltage setpoint based at least in part on the one or more bias commands.

At 706, the method 700 includes controlling, by the first controller, the first DC/DC converter based at least in part on the first adjusted voltage setpoint.

Figure 8:
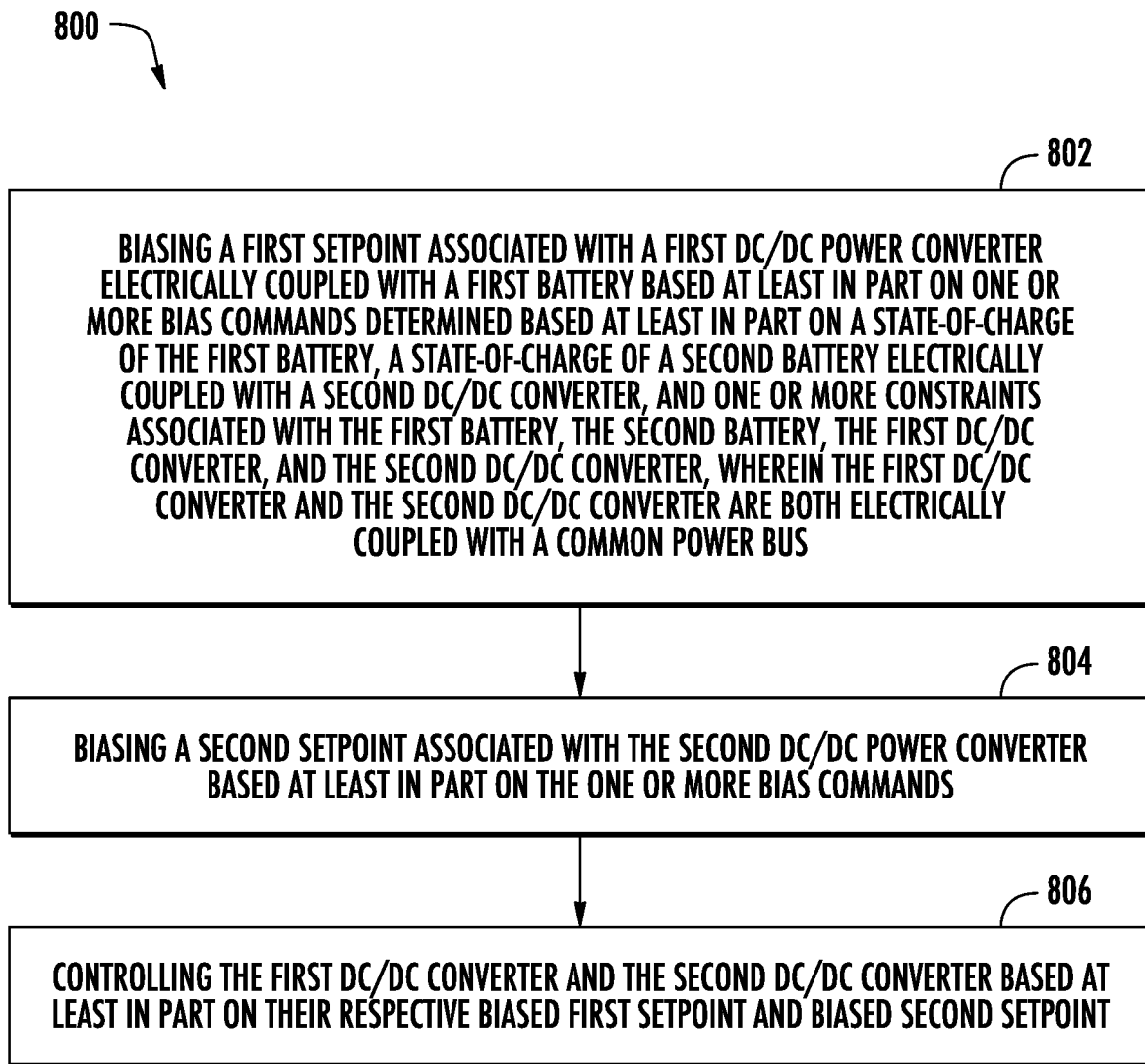
FIG. 8 provides a flow diagram for a method of implementing a power balancing control scheme for an electrical power system.

FIG. 8 provides a flow diagram for a method 800 of implementing a power balancing control scheme for an electrical power system.

At 802, the method 800 includes biasing a first setpoint associated with a first DC/DC power converter electrically coupled with a first battery based at least in part on one or more bias commands determined based at least in part on a state-of-charge of the first battery, a state-of-charge of a second battery electrically coupled with a second DC/DC converter, and one or more constraints associated with the first battery, the second battery, the first DC/DC converter, and the second DC/DC converter, wherein the first DC/DC converter and the second DC/DC converter are both electrically coupled with a common power bus.

At 804, the method 800 includes biasing a second setpoint associated with the second DC/DC power converter based at least in part on the one or more bias commands.

At 806, the method 800 includes controlling the first DC/DC converter and the second DC/DC converter based at least in part on their respective biased first setpoint and biased second setpoint.

FIG. 9 provides a flow diagram for a method 900 of implementing a power balancing control scheme for an electrical power system.

At 902, the method 900 includes biasing a setpoint associated with each one of a plurality of DC/DC power converters each being electrically coupled with respective batteries, each one of the setpoints being biased based at least in part on one or more bias commands determined based at least in part on a state-of-charge of each battery of the respective batteries and one or more constraints associated with each battery of the respective batteries and each DC/DC power converter of the plurality of DC/DC power converters, and wherein each DC/DC converter is electrically coupled with a common power bus. In some implementations, the plurality of DC/DC power converters includes at least three DC/DC power converters each being electrically coupled with respective batteries. Thus, the system also includes at least three batteries. In some implementations, the plurality of DC/DC power converters includes at least three but equal to or less than one hundred DC/DC power converters each being electrically coupled with respective batteries.

At 904, the method includes controlling the plurality of DC/DC converters based at least in part on their respective biased setpoints.

Figure 10:
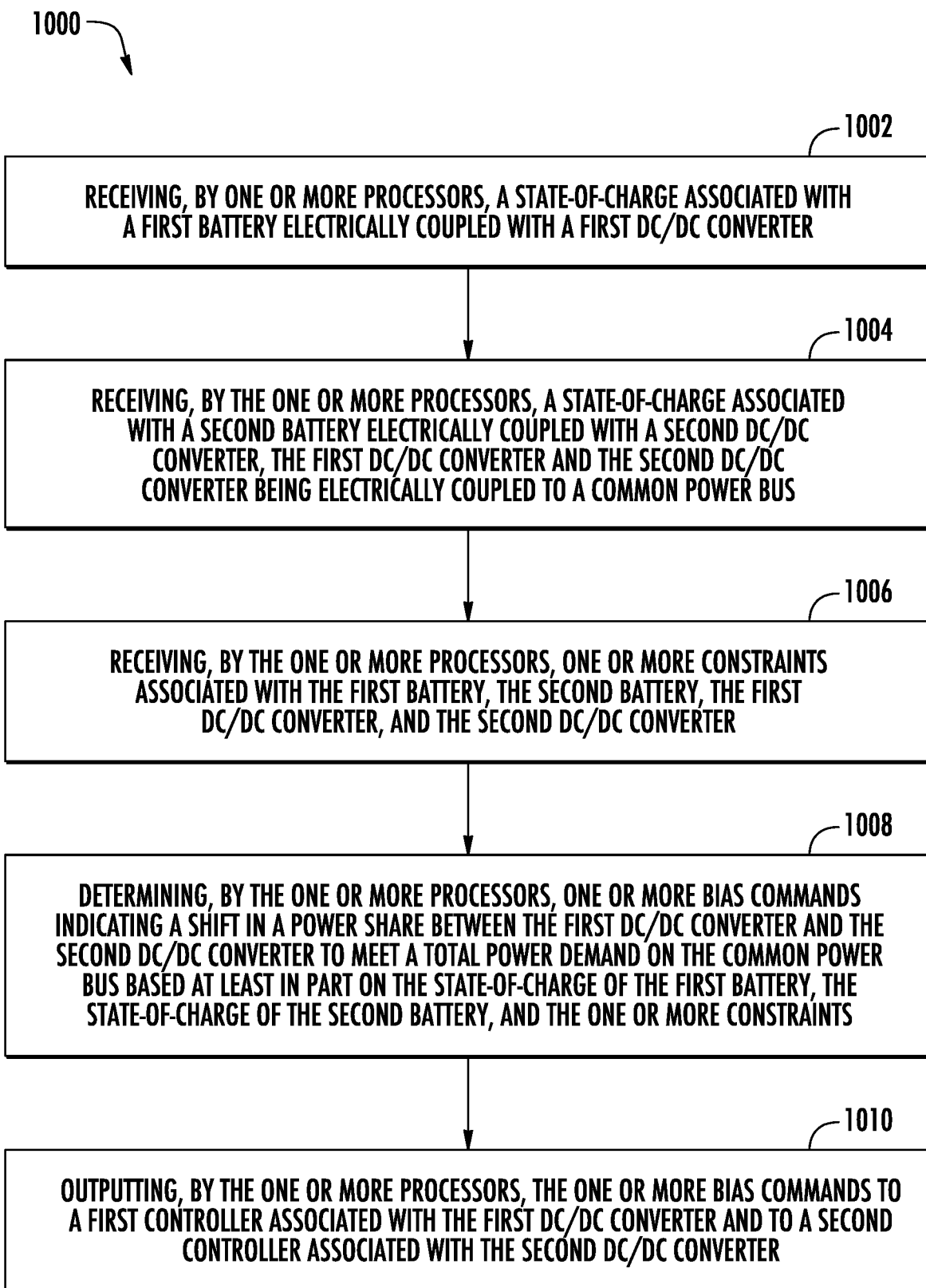
FIG. 10 provides a flow diagram for a method of determining one or more bias commands for implementing a power balancing control scheme for an electrical power system.

FIG. 10 provides a flow diagram for a method 1000 of determining one or more bias commands for implementing a power balancing control scheme for an electrical power system.

At 1002, the method 1000 includes receiving, by one or more processors, a state-of-charge associated with a first battery electrically coupled with a first DC/DC converter. For instance, the one or more processors can be one or more processors of a supervisor controller.

At 1004, the method 1000 includes receiving, by the one or more processors, a state-of-charge associated with a second battery electrically coupled with a second DC/DC converter, the first DC/DC converter and the second DC/DC converter being electrically coupled to a common power bus.

At 1006, the method 1000 includes receiving, by the one or more processors, one or more constraints associated with the first battery, the second battery, the first DC/DC converter, and the second DC/DC converter.

At 1008, the method 1000 includes determining, by the one or more processors, one or more bias commands indicating a shift in a power share between the first DC/DC converter and the second DC/DC converter to meet a total power demand on the common power bus based at least in part on the state-of-charge of the first battery, the state-of-charge of the second battery, and the one or more constraints.

At 1010, the method 1000 includes outputting, by the one or more processors, the one or more bias commands to a first controller associated with the first DC/DC converter and to a second controller associated with the second DC/DC converter.

Figure 11:
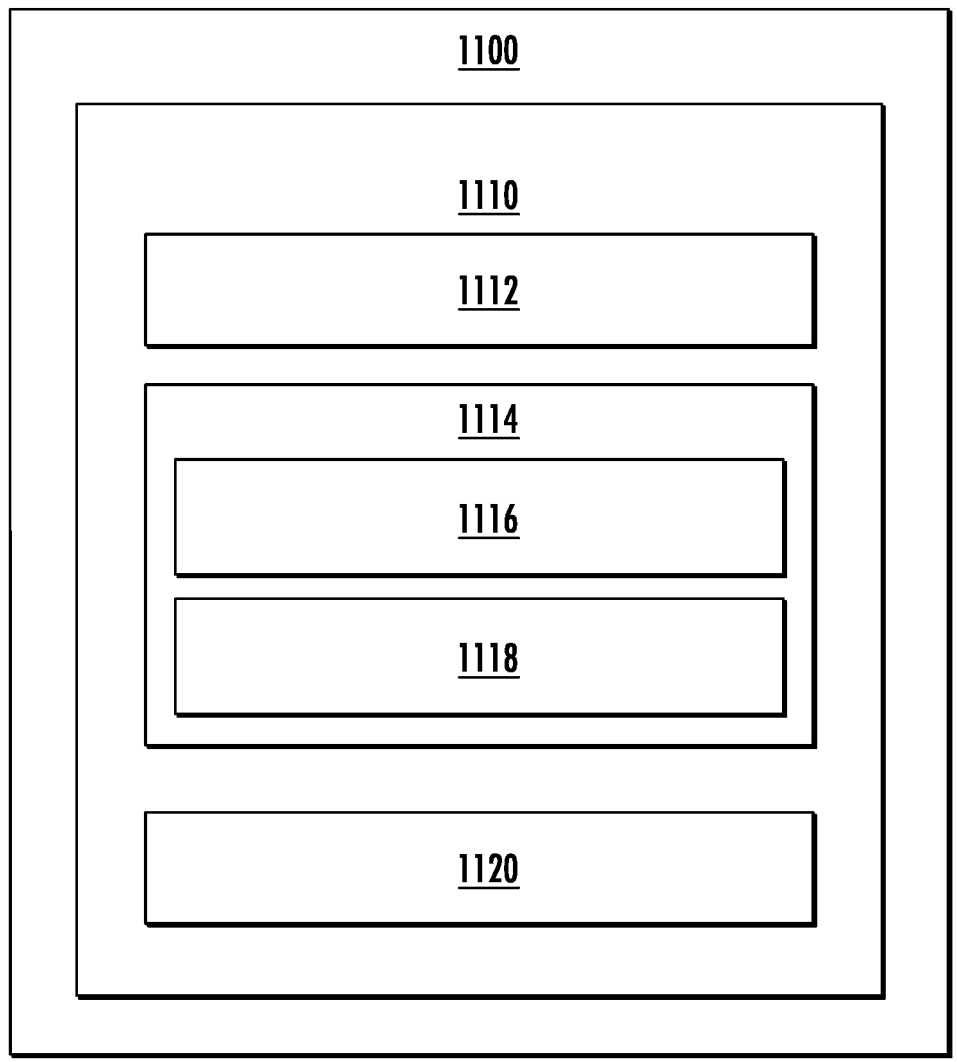
FIG. 11 provides an example computing system according to example embodiments of the present disclosure.

FIG. 11 provides an example computing system 1100 according to example embodiments of the present disclosure. As shown, the computing system 1100 can include one or more computing device(s) 1110. The first controller 210, the second controller 220, and the supervisor controller 188 can be configured in the same or similar manner as the computing device(s) 1110. As shown, the computing device(s) 1110 can include one or more processor(s) 1112 and one or more memory device(s) 1114. The one or more processor(s) 1112 can include any suitable processing device, such as a microprocessor, microcontroller, integrated circuit, logic device, and/or other suitable processing device. The one or more memory device(s) 1114 can include one or more computer-executable or computer-readable media, including, but not limited to, non-transitory computer-readable media, RAM, ROM, hard drives, flash drives, and/or other memory devices.

The one or more memory device(s) 1114 can store information accessible by the one or more processor(s) 1112, including computer-readable or computer-executable instructions 1116 that can be executed by the one or more processor(s) 1112. The instructions 1116 can be any set of instructions that when executed by the one or more processor(s) 1112, cause the one or more processor(s) 1112 to perform operations. In some embodiments, the instructions 1116 can be executed by the one or more processor(s) 1112 to cause the one or more processor(s) 1112 to perform operations, such as any of the operations and functions for which the computing system 1100 and/or the computing device(s) 1110 are configured. The instructions 1116 can be software written in any suitable programming language or can be implemented in hardware. Additionally, and/or alternatively, the instructions 1116 can be executed in logically and/or virtually separate threads on processor(s) 1112. The memory device(s) 1114 can further store 1118 that can be accessed by the processor(s) 1112. For example, the 1118 can include models, lookup tables, databases, etc.

The computing device(s) 1110 can also include a network 1120 used to communicate, for example, with the other components of system 1100 (e.g., via a communication network). The network 1120 can include any suitable components for interfacing with one or more network(s), including for example, transmitters, receivers, ports, controllers, antennas, and/or other suitable components. One or more devices can be configured to receive one or more commands from the computing device(s) 1110 or provide one or more commands to the computing device(s) 1110.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

Further aspects of the present disclosure are provided by the subject matter of the following clauses:

1. A system, comprising: a first battery; a first DC/DC converter electrically coupled with the first battery, the first DC/DC converter having a first controller; a second battery; a second DC/DC converter electrically coupled with the second battery; and a power bus, the first DC/DC converter and the second DC/DC converter both being electrically coupled with the power bus, the first controller being configured to: receive one or more bias commands indicating a shift in a power share of the first DC/DC converter to meet a total power demand on the power bus, the one or more bias commands being determined based at least in part on at least one of: i) a state-of-charge of the first battery and a state-of-charge of the second battery, and ii) one or more constraints associated with the first battery, the second battery, the first DC/DC converter, and the second DC/DC converter; adjust a first voltage setpoint associated with the first DC/DC converter to a first adjusted voltage setpoint based at least in part on the one or more bias commands; and control the first DC/DC converter based at least in part on the first adjusted voltage setpoint.

2. The system of any preceding clause, wherein when the first battery has a state-of charge that is different than the state-of-charge of the second battery, the one or more bias commands being determined so as to modify the power share of the first DC/DC converter to meet the total power demand.

3. The system of any preceding clause, wherein the one or more constraints associated with the first battery include at least one of a discharge capability and a charge capability, the discharge capability indicating an amount of electrical power that can be discharged from the first battery and the charge capability indicating an amount of electrical power that the first battery can accept.

4. The system of any preceding clause, wherein the one or more constraints associated with the second battery include at least one of a discharge capability and a charge capability, the discharge capability indicating an amount of electrical power that can be discharged from the second battery and the charge capability indicating an amount of electrical power that the second battery can accept.

5. The system of any preceding clause, wherein the one or more constraints associated with the first DC/DC converter and the second DC/DC converter include a discharge power capability associated with the first DC/DC converter, a charge power capability associated with the first DC/DC converter, a discharge power capability associated with the second DC/DC converter, and a charge power capability associated with the second DC/DC converter.

6. The system of any preceding clause, wherein the second DC/DC converter has a second controller, the second controller being configured to: adjust a second voltage setpoint associated with the second DC/DC converter to a second adjusted voltage setpoint based at least in part on the one or more bias commands; and control the second DC/DC converter based at least in part on the second adjusted voltage setpoint.

7. The system of any preceding clause, wherein when the second battery has a state-of charge that is different than the state-of-charge of the first battery, the one or more bias commands being determined so as to modify the power share of the second DC/DC converter to meet the total power demand.

8. The system of any preceding clause, wherein the one or more bias commands are determined by a supervisor controller communicatively coupled with the first controller, the second controller, the first battery, and the second battery.

9. The system of any preceding clause, wherein the supervisor controller is configured to: receive the state-of-charge associated with the first battery; receive the state-of-charge associated with the second battery; receive the one or more constraints, the one or more constraints including at least one of a discharge capability and a charge capability associated with the first battery, at least one of a discharge capability and a charge capability associated with the second battery, at least one of a discharge power capability and a charge power capability associated with the first DC/DC converter, and at least one of a discharge power capability and a charge power capability associated with the second DC/DC converter; and determine the one or more bias commands based at least in part on the state-of-charge of the first battery, the state-of-charge of the second battery, and the one or more constraints.

10. The system of any preceding clause, wherein the first controller is configured to: determine a first power delta based at least in part on the one or more bias commands, a power level at the first DC/DC converter, and a power level at the second DC/DC converter; determine a first voltage adjuster based at least in part on the first power delta, the power level at the first DC/DC converter, and the power level at the second DC/DC converter; receive the first voltage setpoint; receive a first feedback voltage indicating an actual voltage associated with the first DC/DC converter; and determine the first adjusted voltage setpoint based at least in part on the first voltage setpoint, the first feedback voltage, and the first voltage adjuster, and wherein, in controlling the first DC/DC converter based at least in part on the first adjusted voltage setpoint, the first controller is configured to control the first DC/DC converter based at least in part on the first adjusted voltage setpoint.

11. The system of any preceding clause, wherein when the first power delta is determined so as to balance the state-of-charge of the first battery with the state-of-charge of the second battery.

12. The system of any preceding clause, wherein when the first power delta is not zero, the power share of the first DC/DC converter is different than a power share of the second DC/DC converter to meet the total power demand on the power bus.

13. The system of any preceding clause, wherein the system is one of a hybrid-electric propulsion system and an electric propulsion system of an aircraft.

14. A system, comprising: a first battery; a first DC/DC converter electrically coupled with the first battery, the first DC/DC converter having a first controller; a second battery; a second DC/DC converter electrically coupled with the second battery, the second DC/DC converter having a second controller; a power bus, the first DC/DC converter and the second DC/DC converter both being electrically coupled with the power bus; a supervisor controller communicatively coupled with the first controller, the second controller, the first battery, and the second battery, the supervisor controller being configured to: receive a state-of-charge associated with the first battery; receive a state-of-charge associated with the second battery; receive one or more constraints associated with the first battery, the second battery, the first DC/DC converter, and the second DC/DC converter; determine one or more bias commands indicating a shift in a power share between the first DC/DC converter and the second DC/DC converter to meet a total power demand on the power bus based at least in part on the state-of-charge of the first battery, the state-of-charge of the second battery, and the one or more constraints; and output the one or more bias commands to the first controller and to the second controller.

15. The system of any preceding clause, wherein the supervisor controller is configured to: determine a raw bias based at least in part on the state-of-charge of the first battery and the state-of-charge of the second battery.

16. The system of any preceding clause, wherein the supervisor controller is configured to: determine a first power maximum associated with the first DC/DC converter based at least in part on a minimum of a discharge power capability of the first DC/DC converter and a discharge capability of the first battery; determine a second power maximum associated with the second DC/DC converter based at least in part on a minimum of a discharge power capability of the second DC/DC converter and a discharge capability of the second battery; determine a first power minimum associated with the first DC/DC converter based at least in part on a maximum of a charge power capability of the first DC/DC converter and a charge capability of the first battery; and determine a second power minimum associated with the second DC/DC converter based at least in part on a maximum of a charge power capability of the second DC/DC converter and a charge capability of the second battery.

17. The system of any preceding clause, wherein the supervisor controller is configured to: determine a first bias maximum based at least in part on the first power maximum and the total power demand on the power bus; determine a first bias minimum based at least in part on the first power minimum and the total power demand on the power bus; determine a second bias maximum based at least in part on the second power maximum and the total power demand on the power bus; and determine a second bias minimum based at least in part on the second power minimum and the total power demand on the power bus.

18. The system of any preceding clause, wherein the supervisor controller is configured to: determine an upper bias limit based at least in part on the first bias maximum and the second bias minimum; determine a lower bias limit based at least in part on the first bias minimum and the second bias maximum; and determine the one or more bias commands based at least in part on the upper bias limit, the lower bias limit, and the raw bias.

19. The system of any preceding clause, wherein the upper bias limit is determined as a minimum of the first bias maximum and the second bias minimum, and wherein the lower bias limit is determined as a maximum of the first bias minimum and the second bias maximum.

20. The system of any preceding clause, wherein when the raw bias is between the upper bias limit and the lower bias limit, the one or more bias commands is determined as the raw bias.

21. A non-transitory computer readable medium comprising computer-executable instructions, which, when executed by one or more processors associated with a first DC/DC converter electrically coupled with a first battery, cause the one or more processors to: receive one or more bias commands indicating a shift in a power share of the first DC/DC converter to meet a total power demand on a power bus, the one or more bias commands being determined based at least in part on a state-of-charge of the first battery, a state-of-charge of a second battery electrically coupled with a second DC/DC converter, and one or more constraints associated with the first battery, the second battery, the first DC/DC converter, and the second DC/DC converter, wherein the first DC/DC converter and the second DC/DC converter are electrically coupled with the power bus; adjust a first voltage setpoint associated with the first DC/DC converter to a first adjusted voltage setpoint based at least in part on the one or more bias commands so as to change the power share of the first DC/DC converter; and control the first DC/DC converter based at least in part on the first adjusted voltage setpoint.

22. A non-transitory computer readable medium comprising computer-executable instructions, which, when executed by one or more processors of a supervisor controller, cause the one or more processors to: receive a state-of-charge associated with a first battery electrically coupled with a first DC/DC converter; receive a state-of-charge associated with a second battery electrically coupled with a second DC/DC converter, the first DC/DC converter and the second DC/DC converter being electrically coupled to a common power bus; receive one or more constraints associated with the first battery, the second battery, the first DC/DC converter, and the second DC/DC converter; determine one or more bias commands indicating a shift in a power share between the first DC/DC converter and the second DC/DC converter to meet a total power demand on the common power bus based at least in part on the state-of-charge of the first battery, the state-of-charge of the second battery, and the one or more constraints; and output the one or more bias commands to a first controller associated with the first DC/DC converter and to a second controller associated with the second DC/DC converter.

23. A method, comprising: receiving, by a first controller associated with a first DC/DC converter electrically coupled with a first battery, one or more bias commands indicating a shift in a power share of the first DC/DC converter to meet a total power demand on a power bus, the one or more bias commands being determined based at least in part on a state-of-charge of the first battery, a state-of-charge of a second battery electrically coupled with a second DC/DC converter, and one or more constraints associated with the first battery, the second battery, the first DC/DC converter, and the second DC/DC converter, and wherein the second DC/DC converter is electrically coupled with the power bus; adjusting, by the first controller, a first voltage setpoint associated with the first DC/DC converter to a first adjusted voltage setpoint based at least in part on the one or more bias commands; and controlling, by the first controller, the first DC/DC converter based at least in part on the first adjusted voltage setpoint.

24. A method, comprising: biasing a first setpoint associated with a first DC/DC converter electrically coupled with a first battery based at least in part on one or more bias commands determined based at least in part on a state-of-charge of the first battery, a state-of-charge of a second battery electrically coupled with a second DC/DC converter, and one or more constraints associated with the first battery, the second battery, the first DC/DC converter, and the second DC/DC converter, wherein the first DC/DC converter and the second DC/DC converter are both electrically coupled with a common power bus; biasing a second setpoint associated with the second DC/DC converter based at least in part on the one or more bias commands; and controlling the first DC/DC converter and the second DC/DC converter based at least in part on their respective biased first setpoint and biased second setpoint.

25. A method, comprising: biasing a setpoint associated with each one of a plurality of DC/DC converters each being electrically coupled with respective batteries, each one of the setpoints being biased based at least in part on one or more bias commands determined based at least in part on a state-of-charge of each battery of the respective batteries and one or more constraints associated with each battery of the respective batteries and each DC/DC converter of the plurality of DC/DC converters, and wherein each DC/DC converter is electrically coupled with a common power bus; and controlling the plurality of DC/DC converters based at least in part on their respective biased setpoints.

26. A method, comprising: receiving, by one or more processors, a state-of-charge associated with a first battery electrically coupled with a first DC/DC converter; receiving, by the one or more processors, a state-of-charge associated with a second battery electrically coupled with a second DC/DC converter, the first DC/DC converter and the second DC/DC converter being electrically coupled to a common power bus; receiving, by the one or more processors, one or more constraints associated with the first battery, the second battery, the first DC/DC converter, and the second DC/DC converter; determining, by the one or more processors, one or more bias commands indicating a shift in a power share between the first DC/DC converter and the second DC/DC converter to meet a total power demand on the common power bus based at least in part on the state-of-charge of the first battery, the state-of-charge of the second battery, and the one or more constraints; and outputting, by the one or more processors, the one or more bias commands to a first controller associated with the first DC/DC converter and to a second controller associated with the second DC/DC converter.

27. A system, comprising: a first battery; a first DC/DC converter electrically coupled with the first battery; a second battery; a second DC/DC converter electrically coupled with the first battery; and a power bus electrically coupled with the first DC/DC converter and with the second DC/DC converter.

28. A system, comprising: a first battery; a first DC/DC converter electrically coupled with the first battery, the first DC/DC converter having a first controller; a second battery; a second DC/DC converter electrically coupled with the second battery; and a power bus, the first DC/DC converter and the second DC/DC converter both being electrically coupled with the power bus, the first controller being configured to: receive one or more bias commands indicating a shift in a power share of the first DC/DC converter to meet a total power demand on the power bus, the one or more bias commands being determined based at least in part on a state-of-charge of the first battery and a state-of-charge of the second battery; adjust a first voltage setpoint associated with the first DC/DC converter to a first adjusted voltage setpoint based at least in part on the one or more bias commands; and control the first DC/DC converter based at least in part on the first adjusted voltage setpoint.

29. A system, comprising: a first battery; a first DC/DC converter electrically coupled with the first battery, the first DC/DC converter having a first controller; a second battery; a second DC/DC converter electrically coupled with the second battery; and a power bus, the first DC/DC converter and the second DC/DC converter both being electrically coupled with the power bus, the first controller being configured to: receive one or more bias commands indicating a shift in a power share of the first DC/DC converter to meet a total power demand on the power bus, the one or more bias commands being determined based at least in part on one or more constraints associated with the first battery, the second battery, the first DC/DC converter, and the second DC/DC converter; adjust a first voltage setpoint associated with the first DC/DC converter to a first adjusted voltage setpoint based at least in part on the one or more bias commands; and control the first DC/DC converter based at least in part on the first adjusted voltage setpoint.

What is claimed is:

1. A system, comprising:
   a first battery;
   a first DC/DC converter electrically coupled with the first battery, the first DC/DC converter having a first controller;
   a second battery;
   a second DC/DC converter electrically coupled with the second battery; and
   a power bus, the first DC/DC converter and the second DC/DC converter both being electrically coupled with the power bus,
   the first controller being configured to:
      receive one or more bias commands indicating a shift in a power share of the first DC/DC converter to meet a total power demand on the power bus, the one or more bias commands being determined based at least in part on at least one of: i) a state-of-charge of the first battery and a state-of-charge of the second battery, and ii) one or more constraints associated with the first battery, the second battery, the first DC/DC converter, and the second DC/DC converter;
      adjust a first voltage setpoint associated with the first DC/DC converter to a first adjusted voltage setpoint based at least in part on the one or more bias commands; and
      control the first DC/DC converter based at least in part on the first adjusted voltage setpoint.

2. The system of claim 1, wherein when the first battery has a state-of charge that is different than the state-of-charge of the second battery, the one or more bias commands being determined so as to modify the power share of the first DC/DC converter to meet the total power demand.

3. The system of claim 1, wherein the one or more constraints associated with the first battery include at least one of a discharge capability and a charge capability, the discharge capability indicating an amount of electrical power that can be discharged from the first battery and the charge capability indicating an amount of electrical power that the first battery can accept.

4. The system of claim 1, wherein the one or more constraints associated with the second battery include at least one of a discharge capability and a charge capability, the discharge capability indicating an amount of electrical power that can be discharged from the second battery and the charge capability indicating an amount of electrical power that the second battery can accept.

5. The system of claim 1, wherein the one or more constraints associated with the first DC/DC converter and the second DC/DC converter include a discharge power capability associated with the first DC/DC converter, a charge power capability associated with the first DC/DC converter, a discharge power capability associated with the second DC/DC converter, and a charge power capability associated with the second DC/DC converter.

6. The system of claim 1, wherein the second DC/DC converter has a second controller, the second controller being configured to:
  adjust a second voltage setpoint associated with the second DC/DC converter to a second adjusted voltage setpoint based at least in part on the one or more bias commands; and
  control the second DC/DC converter based at least in part on the second adjusted voltage setpoint.

7. The system of claim 6, wherein when the second battery has a state-of charge that is different than the state-of-charge of the first battery, the one or more bias commands being determined so as to modify the power share of the second DC/DC converter to meet the total power demand.

8. The system of claim 6, wherein the one or more bias commands are determined by a supervisor controller communicatively coupled with the first controller, the second controller, the first battery, and the second battery.

9. The system of claim 8, wherein the supervisor controller is configured to:
  receive the state-of-charge associated with the first battery;
  receive the state-of-charge associated with the second battery;
  receive the one or more constraints, the one or more constraints including at least one of a discharge capability and a charge capability associated with the first battery, at least one of a discharge capability and a charge capability associated with the second battery, at least one of a discharge power capability and a charge power capability associated with the first DC/DC converter, and at least one of a discharge power capability and a charge power capability associated with the second DC/DC converter; and
  determine the one or more bias commands based at least in part on the state-of-charge of the first battery, the state-of-charge of the second battery, and the one or more constraints.

10. The system of claim 1, wherein the first controller is configured to:
  determine a first power delta based at least in part on the one or more bias commands, a power level at the first DC/DC converter, and a power level at the second DC/DC converter;
  determine a first voltage adjuster based at least in part on the first power delta, the power level at the first DC/DC converter, and the power level at the second DC/DC converter;
  receive the first voltage setpoint;
  receive a first feedback voltage indicating an actual voltage associated with the first DC/DC converter; and
  determine the first adjusted voltage setpoint based at least in part on the first voltage setpoint, the first feedback voltage, and the first voltage adjuster, and wherein, in controlling the first DC/DC converter based at least in part on the first adjusted voltage setpoint, the first controller is configured to control the first DC/DC converter based at least in part on the first adjusted voltage setpoint.

11. The system of claim 1, wherein when a first power delta is determined so as to balance the state-of-charge of the first battery with the state-of-charge of the second battery.

12. The system of claim 1, wherein when a first power delta is not zero, the power share of the first DC/DC converter is different than a power share of the second DC/DC converter to meet the total power demand on the power bus.

13. The system of claim 1, wherein the system is one of a hybrid-electric propulsion system and an electric propulsion system of an aircraft.

14. A system, comprising:
  a first battery;
  a first DC/DC converter electrically coupled with the first battery, the first DC/DC converter having a first controller; a second battery;
  a second DC/DC converter electrically coupled with the second battery, the second DC/DC converter having a second controller;
  a power bus, the first DC/DC converter and the second DC/DC converter both being electrically coupled with the power bus;
  a supervisor controller communicatively coupled with the first controller, the second controller, the first battery, and the second battery, the supervisor controller being configured to:
    receive a state-of-charge associated with the first battery; receive a state-of-charge associated with the second battery;
    receive one or more constraints associated with the first battery, the second battery, the first DC/DC converter, and the second DC/DC converter;
    determine one or more bias commands indicating a shift in a power share between the first DC/DC converter and the second DC/DC converter to meet a total power demand on the power bus based at least in part on the state-of-charge of the first battery, the state-of-charge of the second battery, and the one or more constraints; and
    output the one or more bias commands to the first controller and to the second controller.

15. The system of claim 14, wherein the supervisor controller is configured to:
  determine a raw bias based at least in part on the state-of-charge of the first battery and the state-of-charge of the second battery.

16. The system of claim 14, wherein the supervisor controller is configured to:
  determine a first power maximum associated with the first DC/DC converter based at least in part on a minimum of a discharge power capability of the first DC/DC converter and a discharge capability of the first battery;
  determine a second power maximum associated with the second DC/DC converter based at least in part on a minimum of a discharge power capability of the second DC/DC converter and a discharge capability of the second battery;
  determine a first power minimum associated with the first DC/DC converter based at least in part on a maximum of a charge power capability of the first DC/DC converter and a charge capability of the first battery; and determine a second power minimum associated with the second DC/DC converter based at least in part on a maximum of a charge power capability of the second DC/DC converter and a charge capability of the second battery.

17. The system of claim 14, wherein the supervisor controller is configured to:
- determine a first bias maximum based at least in part on the first power maximum and the total power demand on the power bus;
- determine a first bias minimum based at least in part on the first power minimum and the total power demand on the power bus;
- determine a second bias maximum based at least in part on the second power maximum and the total power demand on the power bus; and
- determine a second bias minimum based at least in part on the second power minimum and the total power demand on the power bus.

18. The system of claim 14, wherein the supervisor controller is configured to:
- determine an upper bias limit based at least in part on the first bias maximum and the second bias minimum;
- determine a lower bias limit based at least in part on the first bias minimum and the second bias maximum; and
- determine the one or more bias commands based at least in part on the upper bias limit, the lower bias limit, and the raw bias.

19. The system of claim 18, wherein the upper bias limit is determined as a minimum of the first bias maximum and the second bias minimum, and wherein the lower bias limit is determined as a maximum of the first bias minimum and the second bias maximum.

20. A non-transitory computer readable medium comprising computer-executable instructions, which, when executed by one or more processors associated with a first DC/DC converter electrically coupled with a first battery, cause the one or more processors to:
- receive one or more bias commands indicating a shift in a power share of the first DC/DC converter to meet a total power demand on a power bus, the one or more bias commands being determined based at least in part on a state-of-charge of the first battery, a state-of-charge of a second battery electrically coupled with a second DC/DC converter, and one or more constraints associated with the first battery, the second battery, the first DC/DC converter, and the second DC/DC converter, wherein the first DC/DC converter and the second DC/DC converter are electrically coupled with the power bus;
- adjust a first voltage setpoint associated with the first DC/DC converter to a first adjusted voltage setpoint based at least in part on the one or more bias commands so as to change the power share of the first DC/DC converter;
- control the first DC/DC converter based at least in part on the first adjusted voltage setpoint;
- adjust a second voltage setpoint associated with the second DC/DC converter to a second adjusted voltage setpoint based at least in part on the one or more bias commands; and
- control the second DC/DC converter based at least in part on the second adjusted voltage setpoint.

\* \* \* \* \*